(12) United States Patent  
Yahata et al.

(10) Patent No.: US 12,366,458 B2
(45) Date of Patent: Jul. 22, 2025

(54) INFORMATION PRESENTATION METHOD, INFORMATION PRESENTATION SYSTEM, AND COMPUTER-READABLE MEDIUM

(71) Applicant: PANASONIC INTELLECTUAL PROPERTY MANAGEMENT CO., LTD., Osaka (JP)

(72) Inventors: Hiroshi Yahata, Osaka Fu (JP); Tomoyuki Hirota, Hyogo Ken (JP); Yusaku Naoi, Osaka Fu (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 302 days.

(21) Appl. No.: 18/127,216

(22) Filed: Mar. 28, 2023

(65) Prior Publication Data

US 2023/0314156 A1 Oct. 5, 2023

(30) Foreign Application Priority Data

Mar. 30, 2022 (JP) .................................. 2022-056045
Feb. 8, 2023 (JP) .................................. 2023-017396

(51) Int. Cl.
*G01C 21/36* (2006.01)
*G06F 3/01* (2006.01)
(Continued)

(52) U.S. Cl.
CPC ......... *G01C 21/3638* (2013.01); *G06F 3/013* (2013.01); *G06F 3/04842* (2013.01);
(Continued)

(58) Field of Classification Search
CPC . G01C 21/3638; G06F 3/013; G06F 3/04842; G06T 15/00; G06V 20/59
See application file for complete search history.

(56) References Cited

U.S. PATENT DOCUMENTS

2014/0309806 A1* 10/2014 Ricci ..................... G06F 21/31 701/1
2015/0294431 A1* 10/2015 Fiorucci ................ G07B 15/02 705/13

(Continued)

FOREIGN PATENT DOCUMENTS

JP 6016732 10/2016

*Primary Examiner* — Seth A Silverman
(74) *Attorney, Agent, or Firm* — Greenblum and Bernstein, P.L.C.

(57) ABSTRACT

An information presentation method includes: acquiring position information indicating a current position of a vehicle; acquiring vehicle inside information indicating a situation in a compartment of the vehicle; determining whether a first operation indicating that a first user in the compartment shows an interest in an object present around the vehicle is performed based on the vehicle inside information; in a case in which it is determined that the first operation is performed, displaying, on a display mounted on the vehicle, a 3D map image simulating a field of view of the first user at a first time point when the first operation is performed based on the position information and the vehicle inside information at the first time point, and map information; and displaying a first virtual object so as to be discriminable on the display, the first virtual object being estimated to correspond to the object.

17 Claims, 19 Drawing Sheets

(51) Int. Cl.
*G06F 3/04842* (2022.01)
*G06T 15/00* (2011.01)
*G06V 20/59* (2022.01)

(52) U.S. Cl.
CPC .............. *G06T 15/00* (2013.01); *G06V 20/59* (2022.01); *G06V 2201/07* (2022.01)

(56) References Cited

U.S. PATENT DOCUMENTS

| | | | |
|---|---|---|---|
| 2016/0189544 A1* | 6/2016 | Ricci | G08G 1/096725 701/117 |
| 2018/0350144 A1* | 12/2018 | Rathod | G06Q 20/3224 |
| 2021/0397859 A1* | 12/2021 | Arora | G06V 40/171 |

* cited by examiner

FIG.8
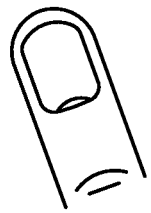

FIG.11

| DATE AND TIME | 20220323T093811+0900 | ... |
|---|---|---|
| USER ID | 10001 | ... |
| FELLOW PASSENGER ID | 12008, 99998 (IDENTIFICATION FAILED) | ... |
| PASSENGER ID | AA-11112222 | ... |
| INTEREST INFORMATION | {<br>"CATEGORY" : "FOOD AND DRINK"<br>"SUBCATEGORY" : "RAMEN"<br>"OBJECT" : "〇〇 NOODLE"<br>"PLACE" : "+34.693308+135.530903CRSWGS_84/"<br>"DEGREE OF INTEREST" : 7<br>:<br>} | ... |

FIG.12

| USER ID | 10001 | ... |
|---|---|---|
| INTEREST CATEGORY | {<br>"FOOD AND DRINK" : 8<br>"HISTORY" : 7<br>"SCENIC SPOT" : 4<br>:<br>} | ... |

INFORMATION PRESENTATION METHOD, INFORMATION PRESENTATION SYSTEM, AND COMPUTER-READABLE MEDIUM

CROSS-REFERENCE TO RELATED APPLICATIONS

This application is based upon and claims the benefit of priority from Japanese Patent Application No. 2022-056045, filed on Mar. 30, 2022 and Japanese Patent Application No. 2023-017396, filed on Feb. 8, 2023, the entire contents of which are incorporated herein by reference.

FIELD

Embodiments described herein relate generally to an information presentation method, an information presentation system, and a computer-readable medium.

BACKGROUND

Japanese Patent No. 6016732 discloses a method of sharing a sight line position of an utterer with an occupant other than the utterer.

However, the technique disclosed in Japanese Patent No. 6016732 needs to be further improved.

SUMMARY

An information presentation method according to the present disclosure is performed by an information presentation system that is mounted on a vehicle and holds map information. The information presentation method includes: acquiring position information indicating a current position of the vehicle from a position sensor mounted on the vehicle; acquiring vehicle inside information indicating a situation in a compartment of the vehicle from at least one first sensor mounted on the vehicle; determining whether a first operation is performed based on the vehicle inside information, the first operation indicating that a first user in the compartment shows an interest in an object present around the vehicle; in a case in which it is determined that the first operation is performed, displaying, on a display mounted on the vehicle, a 3D map image simulating a field of view of the first user at a first time point when the first operation is performed based on the position information and the vehicle inside information at the first time point, and the map information; and displaying a first virtual object so as to be discriminable on the display, the first virtual object being estimated to correspond to the object among one or more virtual objects included in the 3D map image.

BRIEF DESCRIPTION OF THE DRAWINGS

FIG. 8 is a diagram for explaining an example of information display related to the object of interest;

FIG. 11 is a data structure diagram illustrating an example of interest information of the user;

FIG. 12 is a data structure diagram illustrating an example of an interest category of the user;

DETAILED DESCRIPTION

Background of Present Disclosure

Figure 1:
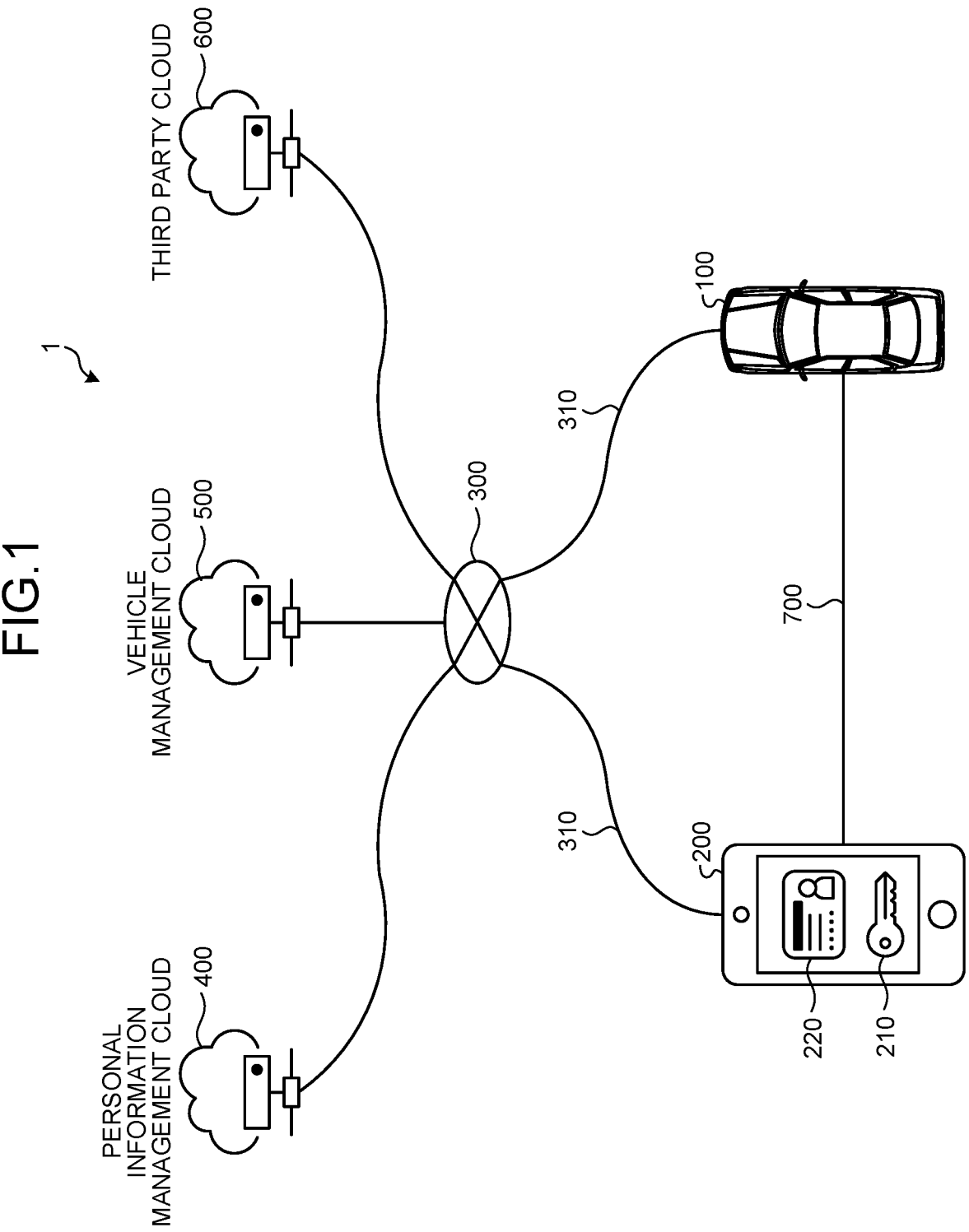
FIG. 1 is a block diagram illustrating an example of the entire configuration of an information presentation system and related equipment.

An environment surrounding our daily life has been increasingly digitized. For example, many people own a smartphone as an information terminal dedicated to an individual, and installs various applications (hereinafter, an application is referred to as an app) in the smartphone to be used, the apps including an app for performing health care of a user, a social communication app for communicating with other people, and the like.

The present disclosure discloses a technique for supporting a user to live a healthy, happy, comfortable, convenient, safe, secure, pleasant, economical, and reasonable life by causing a smartphone as an information terminal having various kinds of information processing capacity, an app operating on the smartphone, a computer that manages and provides various kinds of information connected via a network (hereinafter, this computer is referred to as a cloud or a server. However, in the present disclosure, this computer does not intend to mean only a centralized cloud or server, but includes the entire computer system using a distributed ledger technology in which information is managed by a plurality of computers (nodes), or one computer as a constituent element thereof), a mobile object (hereinafter, referred to as a vehicle) having sophisticated information processing capacity that supports information retrieval performed by the user, and an app operating on the vehicle to cooperate with each other.

The present disclosure can also be implemented as a computer program that causes a computer to execute characteristic configurations included in a control method used herein, or a system operated by this computer program. Such a computer program can be distributed via a computer-readable non-transitory recording medium such as an SD card, or a communication network such as the Internet.

Each of embodiments described below exemplifies a specific example of the present disclosure. A numerical value, a shape, a constituent element, a step, and order of steps described in the following embodiments are merely examples, and do not intend to limit the present disclosure. Among constituent elements in the following embodiments, a constituent element indicating the highest-order concept that is not described in independent claims is explained as an optional constituent element. In all of the embodiments, the constituent elements, steps of processing, and order of the steps can be combined with each other.

Embodiment

In our society, it is expected that the Internet will become more widespread in the future, and various sensors become common. Due to this, in our society, it is also expected that information about an internal state, activity, and the like of an individual and information about the entire city including buildings, transportation networks, and the like are digitized, and can be used by a computer system. Digitized data about individuals (personal information) is safely managed by a cloud server such as an information bank as big data via a communication network, and will be used for various purposes for individuals and society.

Such advanced information society is called Society 5.0 in Japan. The advanced information society is society in which economic development and solution of social problems are expected by an information infrastructure (Cyber-Physical System) obtained by highly integrating a real space (physical space) as a physical world surrounding individuals with a virtual space (cyberspace) in which computers perform various kinds of processing related to the physical space in cooperation with each other.

In such advanced information society, by analyzing communication (including acquisition and provision of information, and behavior in various daily scenes performed by an individual and analyzing big data including accumulated pieces of personal information, it is possible to provide information or a service required for the individual by using a communication method that is assumed to be optimum for the individual corresponding to the scene.

The following describes a specific embodiment for enhancing experience value of movement by promoting and directing new discovery accompanying the movement in advanced information society in which such a Cyber-Physical System operates.

FIG. 1 is a block diagram illustrating an example of the entire configuration of an information presentation system and related equipment. Herein, the information presentation system indicates the entire system or equipment that provides an information presentation function mounted on a vehicle 100 driven by a user, or the vehicle 100 on which the user rides (in a narrow sense, an information input/output unit 106 in FIG. 2). Examples of the equipment related to the information presentation system include an information terminal 200 (for example, a smartphone) owned by the user. The vehicle 100 and the information terminal 200 are connected to the Internet 300 as a wide-area communication network using a wireless communication standard such as cellular communication 310 that is called 4G (fourth-generation mobile communication system) or 5G (fifth-generation mobile communication system), and can access various kinds of information. For example, the vehicle 100 and the information terminal 200 can access a personal information management cloud 400, a vehicle management cloud 500, and a third party cloud 600 via the cellular communication 310 and the Internet 300. The vehicle 100 and the information terminal 200 can also directly perform short-range wireless communication 700 with a device present at a short distance by using Wi-Fi (registered trademark), Bluetooth (registered trademark), UWB as an ultrawide band wireless communication standard, or the like.

The information terminal 200 stores an electronic key 210 for using the vehicle 100, and a digital driver's license 220 as a driver's license of the user. The digital driver's license 220 includes conditions that are required at the time when the user drives. The electronic key 210 required for using the vehicle 100 is acquired by the information terminal 200 by communication via the vehicle management cloud 500 and the Internet 300. The information terminal 200 may further include a personal data store (hereinafter, referred to as a PDS) that collects personal information and information about an interest of the user (hereinafter, referred to as interest information) and manages sharing of the information with a third party based on permission of the user, or an app that provides a function as an information bank providing intermediation function for such social data circulation.

On the Internet 300, there is the personal information management cloud 400 that provides a function of the information bank or the PDS. In the personal information management cloud 400, the personal information, the interest information, and the like of the user are collected to be managed, and use thereof by a third party is managed based on permission of the user. As described above, the PDS function may be provided by a smartphone or the vehicle 100, so that the PDS is comprehensively explained in the present disclosure. It is assumed that such personal information, interest information, and the like are managed by using one or more of the information terminal 200, the vehicle 100, and the personal information management cloud 400 as an entity of the information bank or the PDS. In the present disclosure, pieces of the information may be managed by any of them.

The vehicle management cloud 500 operates in cooperation with the vehicle 100 to enable the vehicle 100 to be used with the electronic key 210 associated with the vehicle 100. Regarding a use state of the vehicle 100 or setting of a safe driving function, the vehicle management cloud 500 acquires, sets, updates, and manages information in cooperation with an app executed by an arithmetic unit 103 of the vehicle 100.

The third party cloud 600 is a cloud for providing a service related to the user and/or the vehicle 100 by a third party. For example, the third party cloud 600 is used for implementing a service of acquiring personal information and interest information of the user as a passenger P from the PDS, and suggesting a place in which the user may be interested depending on time and occasion. Examples of the third party cloud 600 include a map information cloud 600a (refer to FIG. 10) and a travel agency cloud 600b (refer to FIG. 15), for example.

Figure 2:
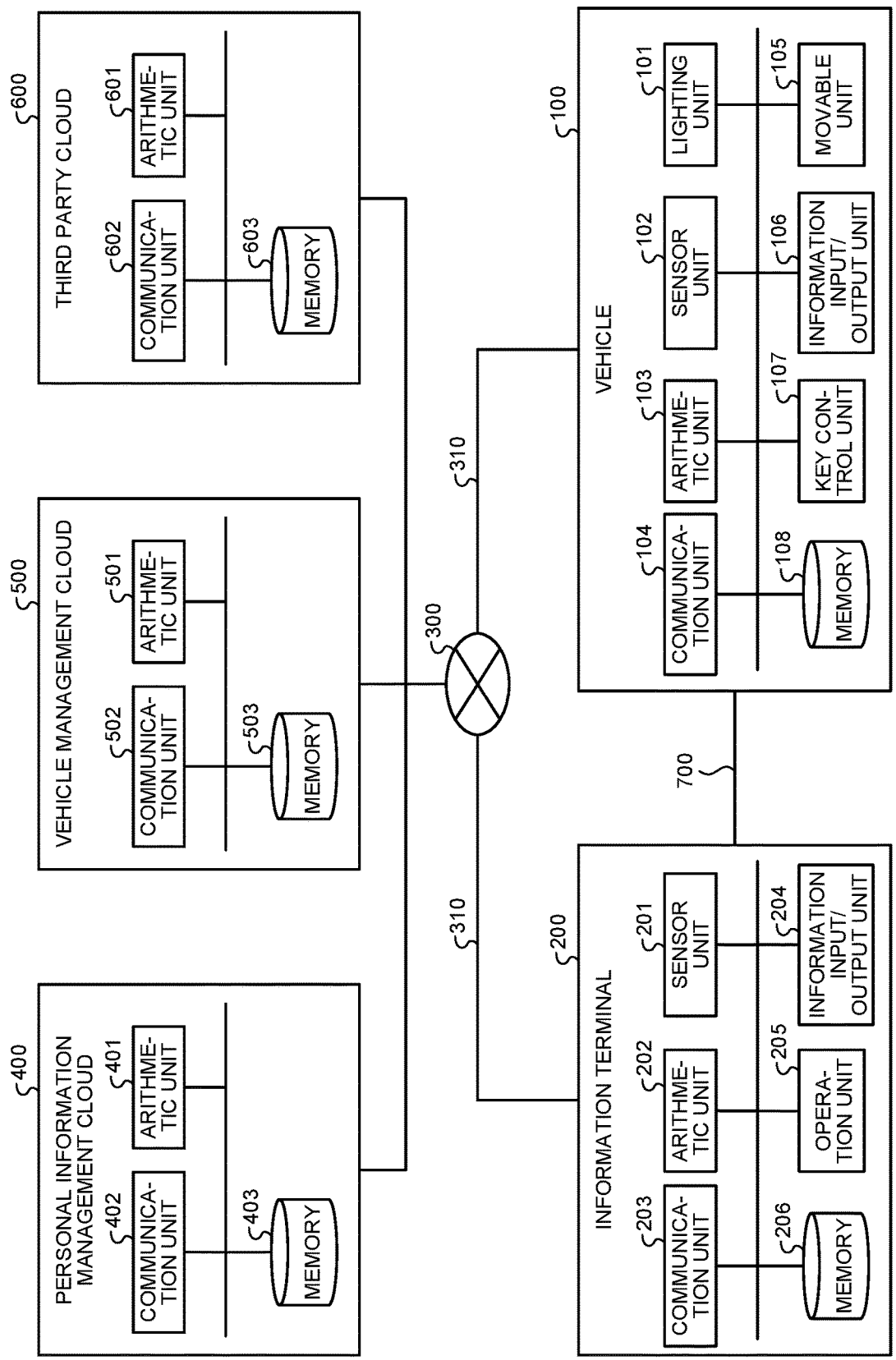
FIG. 2 is a block diagram illustrating an example of the entire configuration of the information presentation system and related equipment.

FIG. 2 is a block diagram illustrating an example of the entire configuration of the information presentation system and related equipment. The information terminal 200 includes: a sensor unit 201 for acquiring a current position, video information, voice information, and/or a physical quantity in a peripheral environment; an information input/output unit 204 for inputting/outputting information such as video or voice to/from the user; an operation unit 205 that receives a button pressing operation, a touch operation, and the like from the user; an arithmetic unit 202 such as a processor that performs information processing such as various kinds of arithmetic operations and information plotting that are performed inside the information terminal 200; a memory 206 that holds data and files used by the arithmetic unit 202, and a communication unit 203 for communicating with other computers on a communication network. As an app that manages a key for using the vehicle 100 with the electronic key 210, an app that manages collected pieces of personal information and interest information and the like are installed in the information terminal 200. In a case in which a computer program included in the app and required data are recorded in the memory 206 of the information terminal 200, the arithmetic unit 202 executes the computer program.

The information terminal 200 is explained as a smartphone, but is not limited thereto. The information terminal 200 may be a smart watch of a wristwatch type, smart glasses of an eyeglass type, a smart ring of a ring type, a smart speaker operated by voice, or a form of a robot including a movable unit.

The personal information management cloud 400 includes: a communication unit 402 for communicating with other computers on a communication network; a memory 403 that records information about the vehicle 100 and the user, and a management computer program therefor; and an arithmetic unit 401 such as a processor that performs various kinds of data processing.

The vehicle management cloud 500 includes: a communication unit 502 for communicating with other computers on a communication network; a memory 503 that records information about the vehicle 100 and the user, and a management computer program therefor; and an arithmetic unit 501 such as a processor that performs various kinds of data processing.

The third party cloud 600 includes: a communication unit 602 for communicating with other computers on a communication network; a memory 603 that records information about the vehicle 100 and the user, and a management computer program therefor; and an arithmetic unit 601 such as a processor that performs various kinds of data processing.

The vehicle 100 includes: a movable unit 105 for moving the vehicle 100 and moving a device (such as a seat) in a compartment space; a lighting unit 101 for lighting surroundings of the vehicle 100 and the inside of the compartment; a sensor unit 102 for detecting a person and a car around the vehicle 100, and positions and states of a person and an object in the compartment; the information input/output unit 106 that provides various kinds of video and voice information to the passenger P, and receives inputs of a touch operation, a voice operation, and the like from the passenger P; a key control unit 107 that authenticate a key to release a lock and controls locking/unlocking of a door of the vehicle 100; the arithmetic unit 103 such as a processor that performs various kinds of processing related to a vehicle basic system and a vehicle function; a memory 108 that records various kinds of data including a computer program of the vehicle basic system and a database of key management; and a communication unit 104 that performs wireless communication with an external apparatus. The sensor unit 102 is connected to the arithmetic unit 103 via at least one interface. The sensor unit 102 includes at least one sensor. Examples of the sensor unit 102 include Light Detection And Ranging (LiDAR) for sensing the surroundings of the vehicle 100, a camera for photographing the surroundings of the vehicle 100, a steering angle of a steering wheel, and an acceleration sensor. Furthermore, examples of the sensor unit 102 include a camera for photographing the inside of the compartment, and a voice microphone for acquiring voice inside the compartment. Examples of the sensor unit 102 may also include a position sensor for acquiring position information indicating the current position of the vehicle 100.

The personal information management cloud 400, the vehicle management cloud 500, the third party cloud 600, the vehicle 100, and the information terminal 200 may communicate with each other by communication means different from the Internet 300 as a wide-area communication network. For example, the short-range wireless communication 700 may be used for unlocking processing performed between the vehicle 100 and the information terminal 200.

Figure 3:
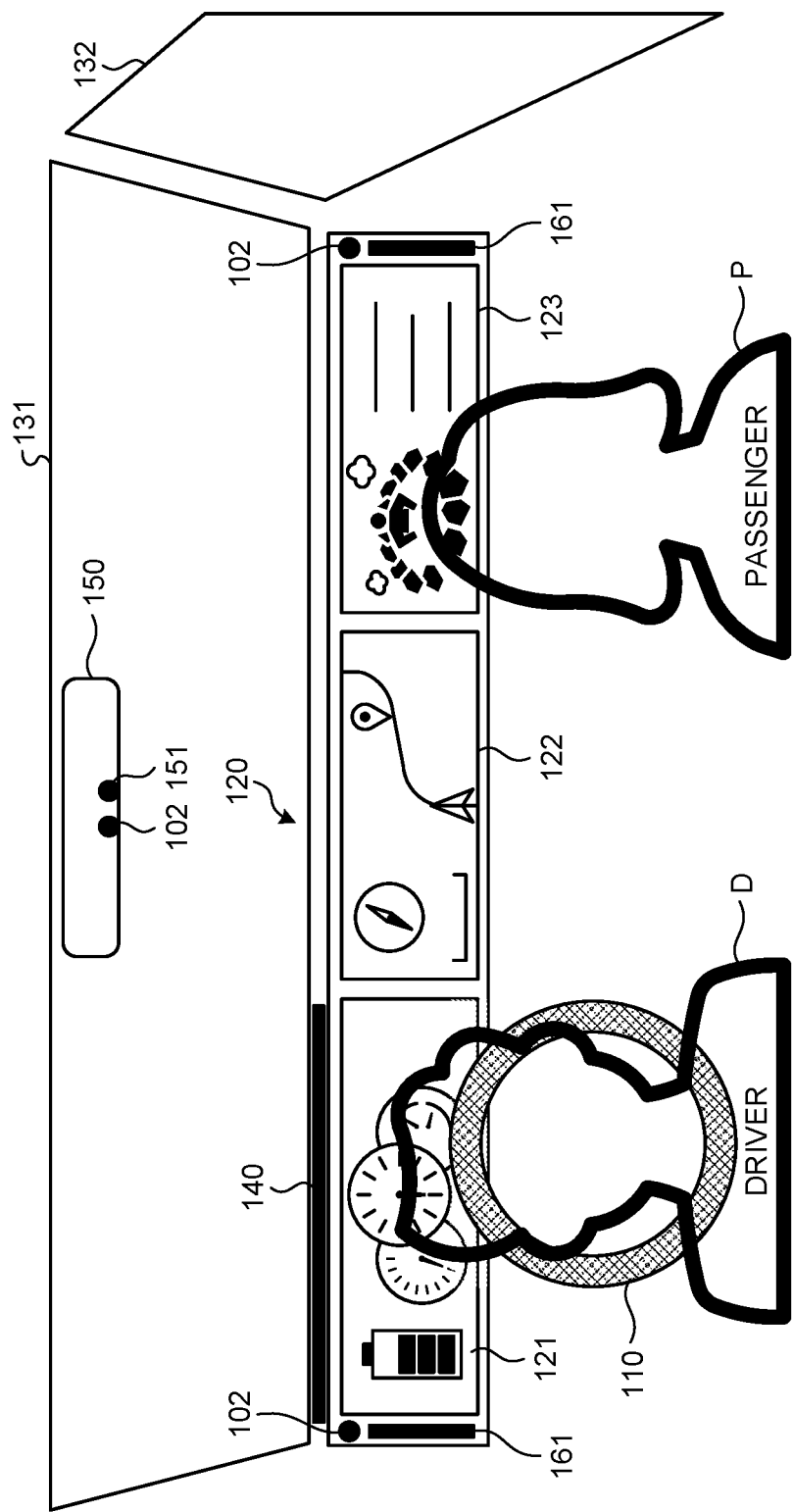
FIG. 3 is a diagram for explaining an example of an information input/output unit provided in a vehicle.

FIG. 3 is a diagram for explaining an example of the information input/output unit 106 provided in the vehicle 100. FIG. 3 illustrates a situation around a driver's seat viewed from the inside of the vehicle 100. A driver D is sitting on the driver's seat and operating a steering wheel 110. The information input/output unit 106 includes a space video projection device 140 and a cockpit 120 that provides various kinds of video and voice information to the driver D and the passenger P, and is equipped with a touch sensor that receives inputs of a touch operation and a voice operation from the driver D and the passenger P. The information input/output unit 106 may also include the sensor unit 102 and a voice microphone 151 in a case of receiving an operation via a touch operation, a gesture, a voice operation, and the like performed by the driver D or the passenger P, and outputting information via the cockpit 120, the space video projection device 140, a speaker 161, and the like.

The cockpit 120 displays information divided into three sections in a horizontal direction. A vehicle information screen 121 including a meter and the like indicating vehicle information is displayed in front of the driver D. A navigation screen 122 indicating navigation information is displayed at the center. An additional information screen 123 indicating additional information is displayed on a right end, the additional information screen 123 displaying information corresponding to time and occasion, and an interest of the user.

A windshield 131 is disposed at the front, and a room mirror 150 is disposed on an upper part, the room mirror 150 equipped with the voice microphone 151 and the sensor unit 102 for detecting a state of the driver D and the passenger P. For example, the sensor unit 102 is an RGB camera, a combination of an infrared light emitting diode (LED) and an infrared camera, a multispectral camera, a radio wave sensor using reflective variation of electromagnetic waves, a microphone, or the like.

In FIG. 3, sensor units 102 are not only disposed on the room mirror 150 but also disposed at left and right ends of the cockpit 120. Two independent speakers 161 are disposed on the left and right of the cockpit 120.

On a dashboard, disposed is the space video projection device 140 for a forward direction of the driver D (such as a head-up display (including a holographic display) that can form a visual image on a transparent panel, the windshield 131, or in a front space of the driver D, a display using a dihedral corner reflector array, a transparent display that displays a visual image on a transparent panel, and a retina display that directly forms an image on a retina).

Figure 4:
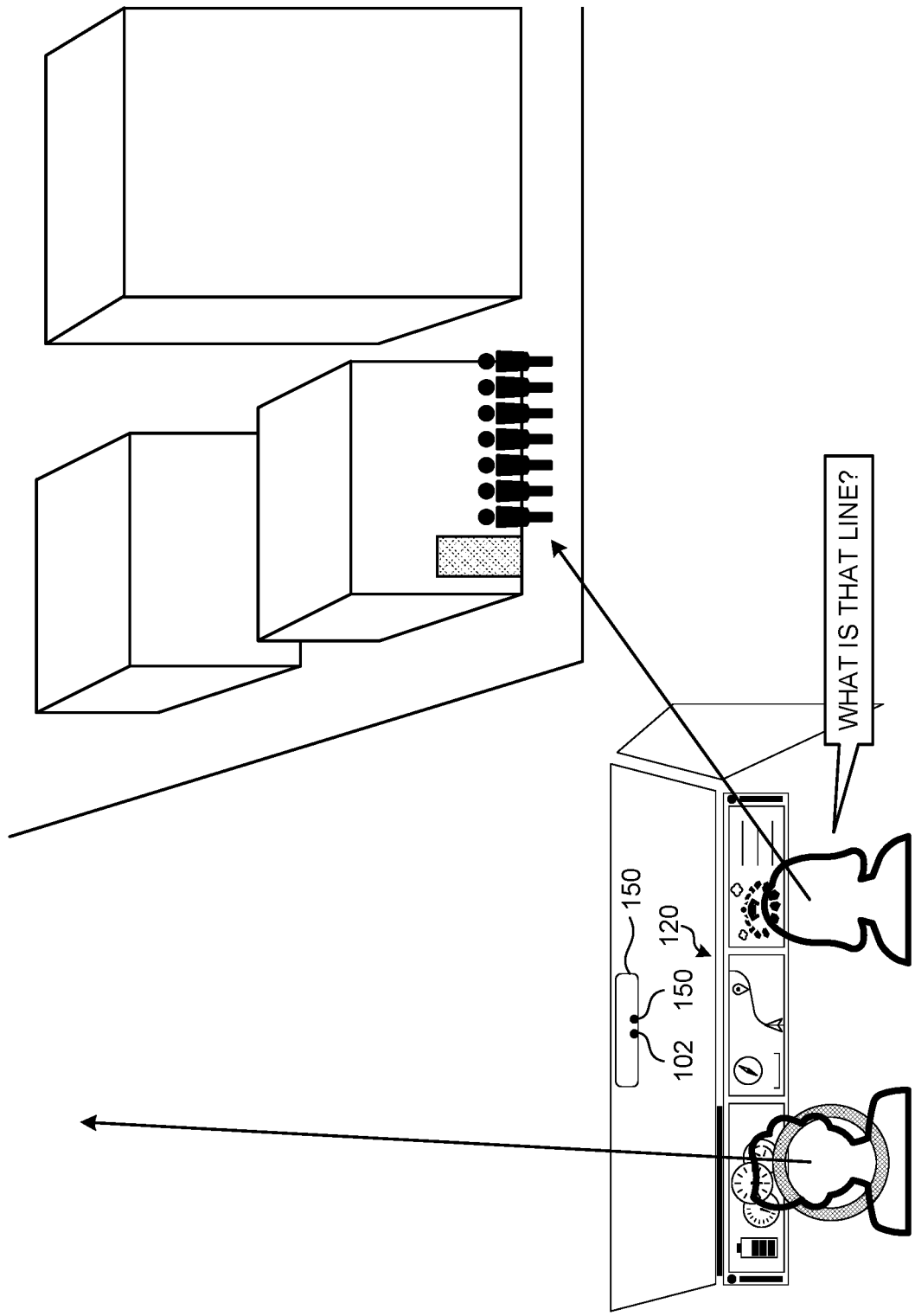
FIG. 4 is a diagram for explaining an example of information retrieval from the vehicle.

FIG. 4 is a diagram for explaining an example of information retrieval from the vehicle 100. There is the cockpit 120 described above with reference to FIG. 3 on the lower left, and a situation around the vehicle 100 is depicted on the upper right. There are some buildings in diagonally right front of a traveling direction of the vehicle 100, and several people are standing in a line in front of a building at a corner lot. The driver D is looking at the front of the traveling direction of the vehicle 100, and his/her line of sight is represented by an arrow. On the other hand, the passenger P sitting on a passenger seat is looking at the line, and he/she wonders why the people are standing in a line and is asking a question of "What is that line?".

As described above, the voice of the passenger P is caught via the voice microphone 151 in the compartment, and a voice signal thereof is recognized as voice by the arithmetic unit 103 of the vehicle 100 and converted into a character string of "What is that line?". Herein, by comparing pieces of voice information from a plurality of the voice microphones 151, or by recognizing movement of a mouth from video of a face of the passenger P shot by the sensor unit 102, the arithmetic unit 103 of the vehicle 100 identifies an utterer of this voice as being the passenger P sitting on the passenger seat. Due to this, the arithmetic unit 103 of the vehicle 100 recognizes that the passenger P sitting on the passenger seat has asked the question of "What is that line?".

Figure 5:
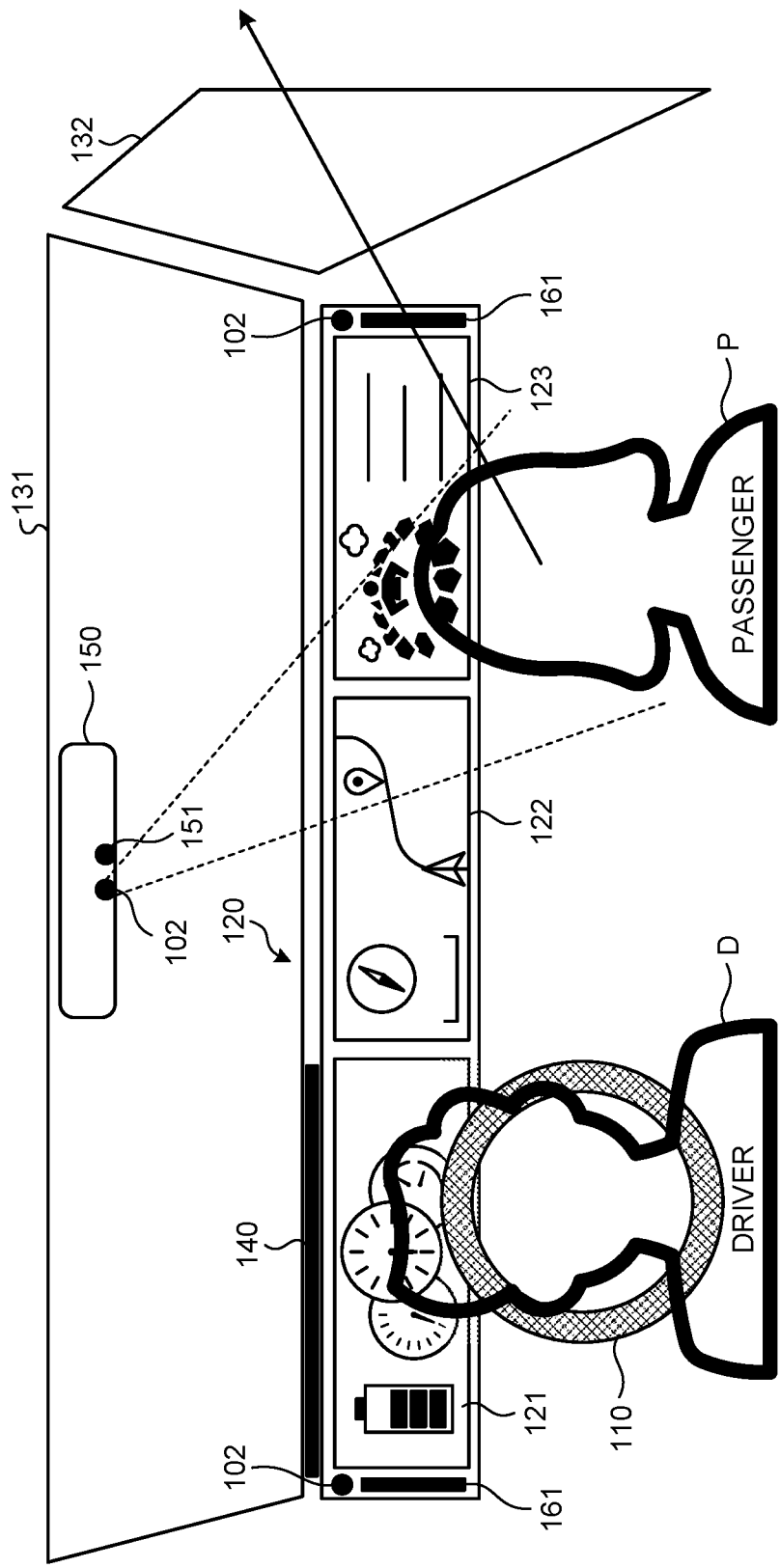
FIG. 5 is a diagram for explaining an example of detecting sight line information of a user.

FIG. 5 is a diagram for explaining an example of detecting sight line information of the user. The arithmetic unit 103 acquires, at the time when the question is asked, the sight line information of the passenger P sitting on the passenger seat who has asked the question by using the sensor unit 102 (a camera and the like) provided in the compartment. For example, the arithmetic unit 103 acquires the video of the face of the passenger P by the sensor unit 102, and can acquire the sight line information by acquiring orientation of the face, positions of eyes, and orientation of the eyes from the video of the face by image recognition. The arithmetic unit 103 acquires vehicle inside information indicating a situation inside the compartment of the vehicle 100 from at least one of the sensor units 102 mounted on the vehicle 100. For example, at least one of the sensor units 102 includes an in-vehicle camera for photographing the inside of the vehicle and a microphone.

Due to this, the arithmetic unit 103 of the vehicle 100 can acquire the sight line information indicating a direction that the passenger P who has asked the question was looking at when he/she asked the question in a coordinate space inside the compartment. For example, the sight line information may be represented by an angle formed by a vehicle body direction representing a direction from a rear side toward a front side of the vehicle 100 and the sight line direction of the passenger P who has asked the question as a two-dimensional plane parallel with a ground surface, or may be represented as a vector in a three-dimensional space in which coordinate axes are fixed based on the vehicle body direction.

Figure 6:
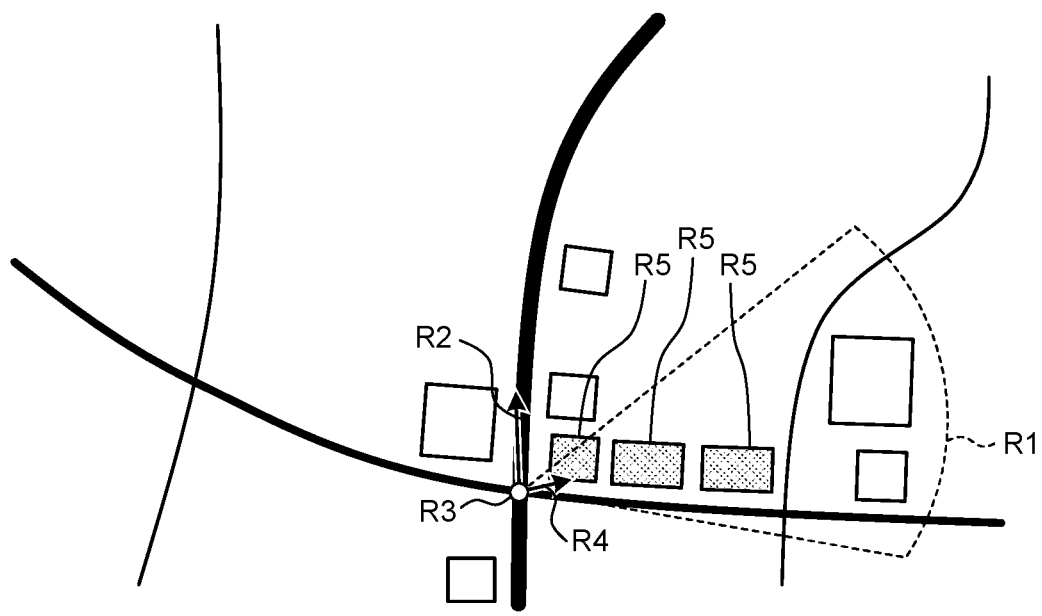
FIG. 6 is a diagram for explaining an example of a retrieval range of an object of interest based on the sight line information.

FIG. 6 is a diagram for explaining an example of a retrieval range R1 of an object of interest based on the sight line information. FIG. 6 represents the sight line information of the passenger P again in a 3D map space around the vehicle 100. At a timing when the passenger P asks the question, the arithmetic unit 103 of the vehicle 100 acquires position information indicating orientation and a current position of the vehicle 100 detected by the sensor unit 102. The arithmetic unit 103 of the vehicle 100 acquires the orientation of the vehicle 100 (vehicle direction R2) and the position information of the vehicle 100 using one or more of a Global Navigation Satellite System (GNSS), a LiDAR that senses a peripheral shape of the vehicle 100, a steering angle of a steering wheel, an acceleration sensor, and the like. That is, the arithmetic unit 103 acquires the position information indicating the current position of the vehicle 100 from the position sensor mounted on the vehicle 100. By adding a seat position at which the passenger P sits and a posture (head position) thereof to the identified position information of the vehicle 100, the arithmetic unit 103 can represent the position information (passenger position R3) of the passenger P who has asked the question on a 3D map space. The passenger position R3 may be replaced with the position information of the vehicle 100.

When the vehicle body direction and the passenger position R3 are determined on the 3D map space, the arithmetic unit 103 can convert the sight line information in the coordinate space inside the compartment described above into information on the 3D map space. The sight line information obtained as described above indicates a passenger sight line direction R4, which is a direction of a line of sight of the passenger P. The arithmetic unit 103 of the vehicle 100 sets the retrieval range R1 in which the object of interest of the passenger P is expected to be present based on the sight line information on the 3D map space. Herein, the arithmetic unit 103 sets, as the retrieval range R1, a fan shape spreading from the passenger position R3 in the sight line direction of the passenger P.

In a case of viewing the retrieval range R1, which is obtained herein, from the passenger position R3 in the sight line direction as a center, the arithmetic unit 103 can extract the object of interest that is easily visually recognized or can be visually recognized by the passenger P due to a position with respect to the passenger P or occlusion by a building. Due to this, the arithmetic unit 103 of the vehicle 100 simulates a landscape viewed by the passenger P from 3D map information instead of two-dimensional map information, and narrows down candidates R5 for the object of interest as candidates for the object of interest.

As a result, three colored buildings (candidates R5 for the object of interest) in FIG. 6 are present in the retrieval range R1 (a certain amount of the buildings overlaps with the range), and are extracted as the candidates R5 for the object of interest that can be easily visually recognized in a case of being viewed from the passenger position R3 at the time when the question is asked in the sight line direction of the user.

In a case in which the extracted candidates R5 for the object of interest (buildings) can be narrowed down to one object of interest with a predetermined amount or more of reliability based on the sight line information, the arithmetic unit 103 may identify the object of interest thereby.

Among the extracted candidates R5 for the object of interest (buildings), in a case in which an object having a high degree of association with the "line" in the question from the passenger P can be evaluated by the arithmetic unit 103 to identify one candidate using the sensor unit 102 (a camera and the like for photographing the surroundings of the vehicle 100) provided in the vehicle 100, or one candidate can be identified by retrieving a degree of association (co-occurrence) with the "line" of each of the buildings on the Internet 300 via the communication unit 104 of the vehicle 100, the object of interest of the passenger P may be identified in that way.

Figure 7:
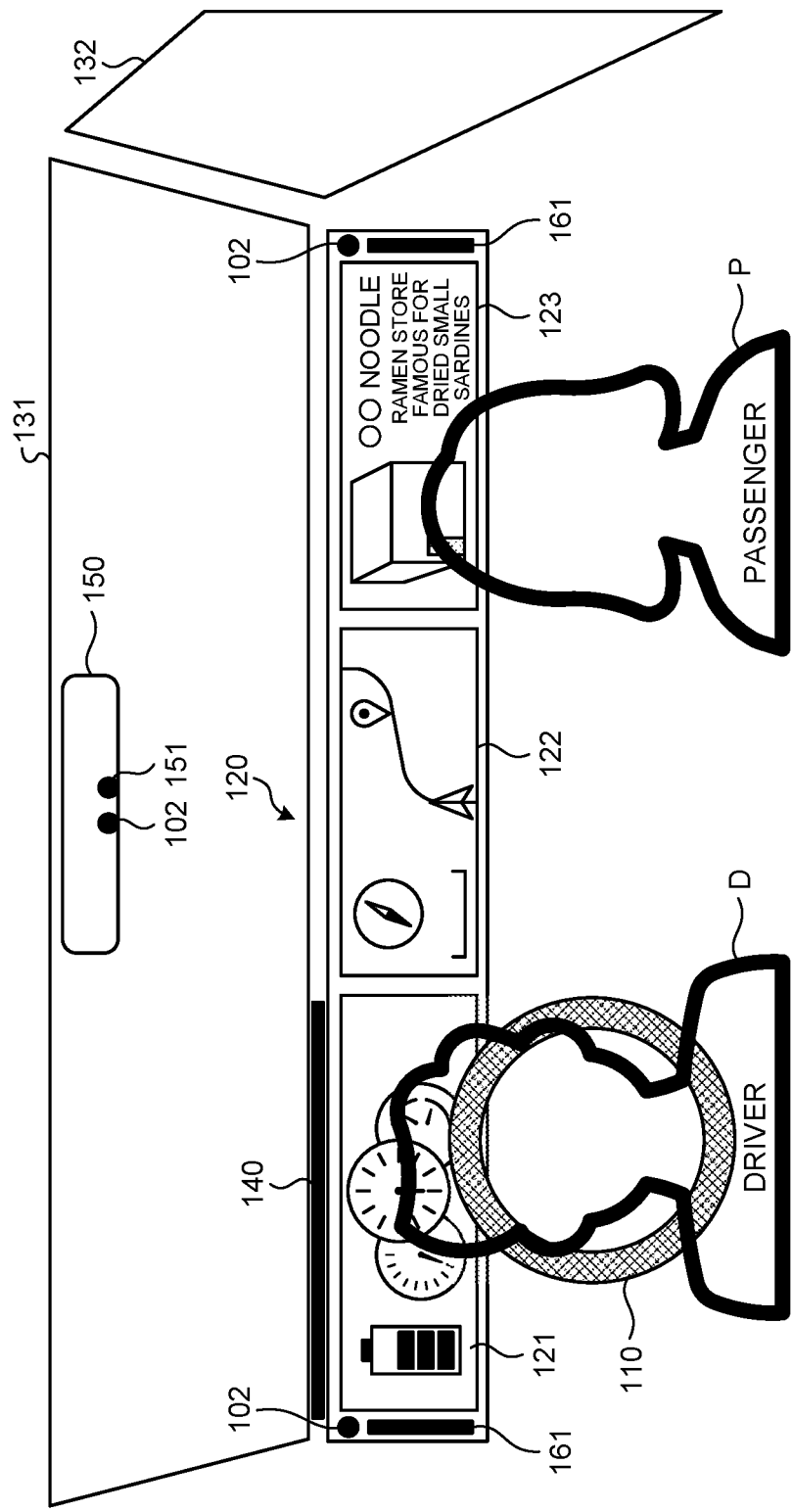
FIG. 7 is a diagram for explaining an example of information display related to the object of interest.
Figure 9:
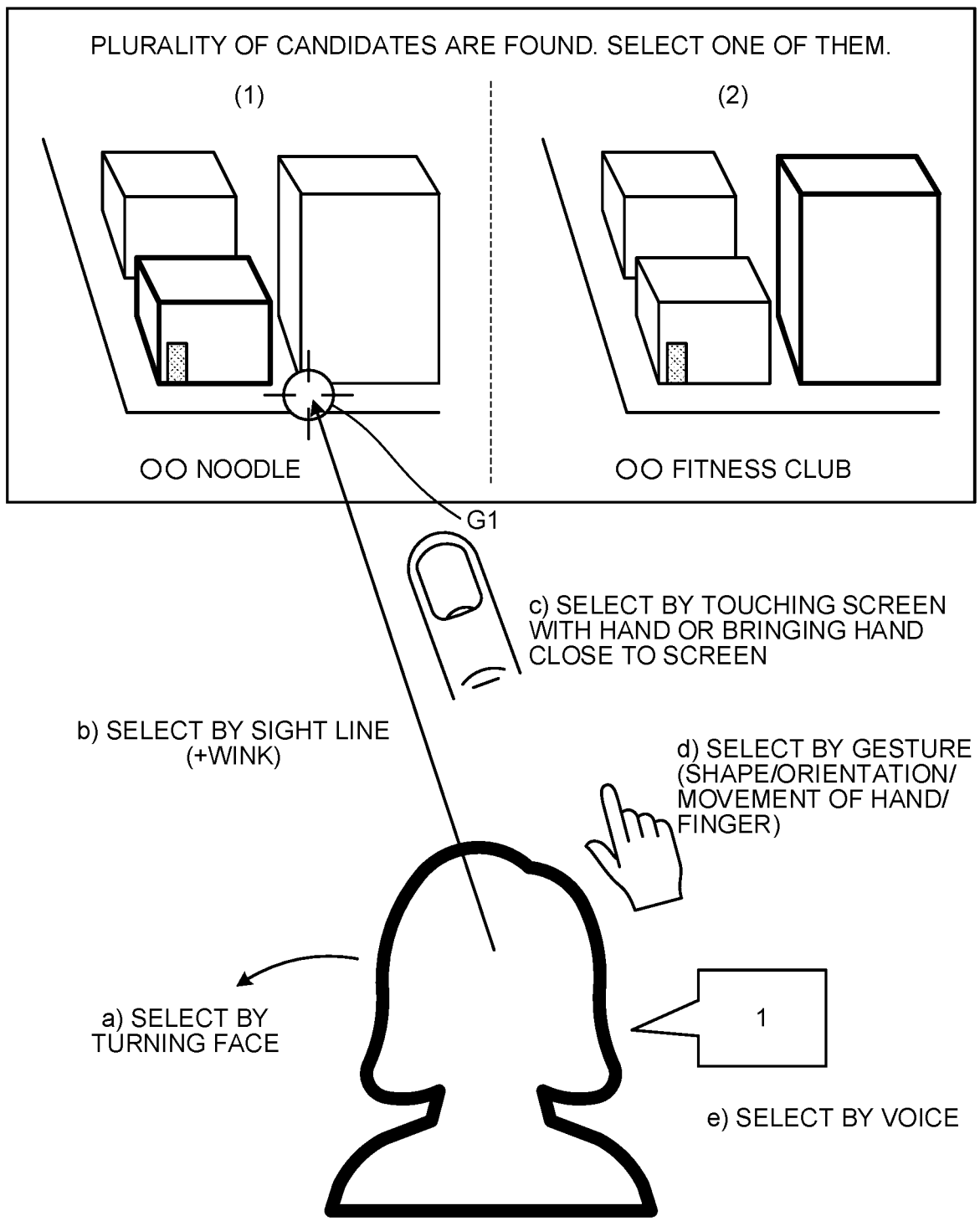
FIG. 9 is a diagram for explaining an example of information display related to the object of interest and a selection method.

In a case in which the objects of interest can be narrowed down to one object of interest based on predetermined reliability, the information input/output unit 106 presents an information retrieval result to the passenger P as illustrated in FIG. 7 and FIG. 8. In this case, like the additional information screen 123 in FIG. 7, only one object of interest that has been narrowed down with predetermined reliability may be displayed. On the other hand, in a case in which the reliability is insufficient for narrowing down the objects of interest into one object of interest, as illustrated in FIG. 9, the information input/output unit 106 displays a plurality of the candidates R5 for the object of interest and causes the user to select the object of interest. In this way, a method of displaying the candidate for the object of interest may be switched depending on a determination result of the reliability of the object of interest.

FIG. 7 and FIG. 8 are diagrams for explaining an example of information display related to the object of interest. In this example, the information retrieval result described above is displayed on the additional information screen 123 indicating additional information of the cockpit 120 close to the passenger P as a questioner. Here, one object of interest (building) of the passenger P can be identified based on at least one of the sight line information, a distance to a place of the line, and relevance to a word of "line", and it is displayed that the object of interest is a ramen store named "○○ noodle", which is famous for dried small sardines.

Due to this, when the passenger P wonders why the people are standing in a line and asks the question of "What is that line?" while looking at the line, the passenger P can get information about the ramen store named "○○ noodle" that is determined to have a high degree of association with the line. As a result, the passenger P can find out that the line is a line for waiting for entering the ramen store, and that this ramen store is a popular store.

Such information can be retrieved by using a smartphone and the like, but it takes time and effort to retrieve every curious thing by the smartphone while seeing a landscape through a vehicle window. An information presentation system 1 can retrieve something about an interest or question that has arisen through the vehicle window without taking time and effort. Thus, the user can obtain new discovery or awareness from a small interest or question that the user does not want to check by the smartphone. Due to this, the information presentation system 1 according to the present disclosure can smoothly provide movement experience that has been hardly achieved such that new discovery and awareness are obtained in accordance with movement in a real space. Due to such new discovery obtained as described above, a behavior modification is expected to be promoted.

FIG. 8 illustrates an example in which an object estimated to be the object of interest is highlighted with a red frame on external appearance video information to check whether the object of interest of the passenger P is correctly recognized, and information related to the object of interest and acquired from the Internet 300 and the like is displayed to the right. The arithmetic unit 103 highlights the object of interest as an identified one or more virtual objects on the 3D map image. In this way, by highlighting the object of interest to be definitely notified in scenery that can be seen from the passenger P, the arithmetic unit 103 can clearly notify the passenger P whether the object of interest is correctly estimated and what information is displayed.

In FIG. 8, if a building adjacent to the highlighted building is the object of interest, for example, the information input/output unit 106 may highlight the adjacent building when the adjacent building is touched by a finger, and display information about the highlighted adjacent building on a side thereof. This is effective for a case of compensating for insufficient accuracy of sight line detection, and particularly useful for a case in which the passenger is sitting on a rear seat and a face image is hardly acquired from the sensor unit 102.

FIG. 9 is a diagram for explaining an example of information display related to the object of interest and a selection method. FIG. 9 illustrates a display example in a case in which the information presentation system 1 cannot narrow down the objects of interest to one object of interest. As illustrated in FIG. 9, in the information input/output unit 106, a monitor that can be seen from the passenger P who has asked the question displays an instruction of "A plurality of candidates are found. Select one of them". Herein, for example, there are two candidates, and the ramen store named "○○ noodle" described above is highlighted on the left together with external appearance video around the store. On the other hand, a store named "○○ fitness club" is similarly highlighted on the right together with external appearance video around the store. In a case in which the objects of interest cannot be narrowed down to one object of interest with a predetermined amount or more of reliability, the information input/output unit 106 may display the candidates at the same time and cause the passenger P to select the candidate as described above.

The information input/output unit 106 may cause the passenger P seeing the candidates to select one of them by turning his/her face toward the candidate to be selected (left or right) because two options are arranged on the left and right. This corresponds to "a) select by turning face" illustrated in FIG. 9.

Alternatively, the information input/output unit 106 may display a sight line marker G1 at a place seen by the passenger P based on the sight line information of the passenger P who has asked the question, and feed back a position of a gazing point to the passenger P to cause the passenger P to select the object of interest. The information input/output unit 106 may select a left half or a right half in a case in which the passenger P sees it for a predetermined time or more, or may immediately determine the selection when the passenger P sees the left half and gives a wink. This corresponds to "b) select by sight line (+wink)" illustrated in FIG. 9.

Alternatively, the information input/output unit 106 may determine one of the candidates using a proximity sensor when a hand or a finger is brought close to a screen. Similarly, the information input/output unit 106 may determine one of the candidates when a hand or a finger touches the screen. This corresponds to "c) select by touching screen with hand or bringing hand close to screen" illustrated in FIG. 9.

Alternatively, the information input/output unit 106 may cause the passenger P who has asked the question to select one of the candidates by using a gesture as a shape, orientation, and movement of a hand or a finger. This corresponds to "d) select by gesture" illustrated in FIG. 9.

Furthermore, the information input/output unit 106 may cause the passenger P who has asked the question to select one of the candidates by designating pieces of identification information (herein, 1 or 2) given as options by voice. This corresponds to "e) select by voice" illustrated in FIG. 9.

As described above, even in a case in which the objects of interest of the passenger P cannot be narrowed down to one object of interest, the arithmetic unit 103 may finally identify the object of interest by sensing selection feedback from the passenger P. After identifying the one object of interest as described above, the information input/output unit 106 may display it as illustrated in FIG. 7 and FIG. 8.

The arithmetic unit 103 may switch the selection methods depending on the seat position of the passenger P who has asked the question. For example, the arithmetic unit 103 may switch between the selection methods depending on ease of a selection operation by the passenger P or the sensor unit 102 in the compartment such that operation is performed by c) illustrated in FIG. 9 in a case in which the passenger P is sitting on a seat on a front side and can reach the screen by hand, and operation is performed by a) illustrated in FIG. 9 in a case in which the passenger P is sitting on a seat on a rear side and cannot reach the screen by hand.

The sensor unit 102 (for example, a camera) in the compartment and the arithmetic unit 103 of the vehicle 100 may sense a plurality of methods of selection feedback at the same time. That is, in both cases in which the passenger P who has asked the question provides feedback by b) illustrated in FIG. 9 or provides feedback by c) illustrated in FIG. 9, the feedback may be caused to be valid.

Accordingly, the passenger P can provide feedback with the lightest burden at this timing, so that convenience of the information presentation system 1 can be enhanced. If the passenger P sitting on the passenger seat asks a question, a hand of the passenger P is not necessarily available and voice of the passenger P is not necessarily available. The most comfortable user interface for such feedback is different depending on a situation, so that it is preferable that operation can be performed via a plurality of user interfaces as described above.

Figure 10:
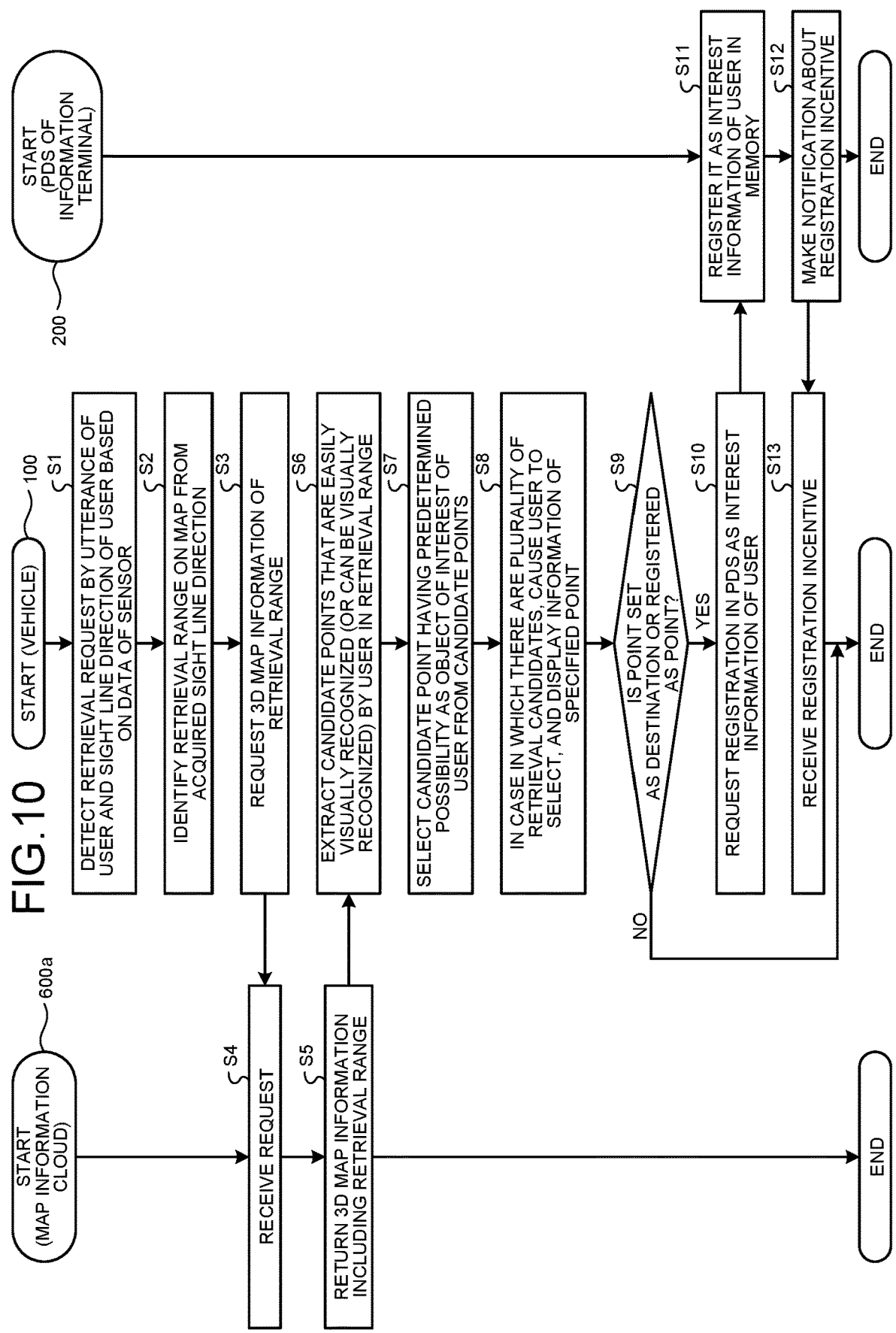
FIG. 10 is a flowchart illustrating an example of information retrieval based on the sight line information.

FIG. 10 is a flowchart illustrating an example of information retrieval based on the sight line information. With reference to FIG. 10, the following describes processing of registering a result of information retrieval performed as described above in the PDS of the information terminal 200 as interest information. The PDS may be a PDS of the personal information management cloud 400 instead of the information terminal 200.

The arithmetic unit 103 of the vehicle 100 detects and recognizes a retrieval request by utterance of the user from a voice signal collected by the voice microphone 151, and performs image recognition on video data shot by the sensor unit 102 (a camera and the like) to detect and recognize the head position (positions of eyes) and the sight line direction of the user (Step S1). That is, the arithmetic unit 103 detects a first phrase uttered by the questioner from the voice signal acquired by the voice microphone 151. The arithmetic unit 103 detects, from the first phrase, a specific phrase indicating that the user has shown an interest in an object outside the vehicle. Due to this, based on the vehicle inside information, the arithmetic unit 103 determines whether a first operation has been performed, the first operation representing that the questioner in the compartment has shown an interest in an object such as a building present around the vehicle 100.

Furthermore, the arithmetic unit 103 of the vehicle 100 identifies the retrieval range R1 on the map based on the current position of the vehicle 100, orientation of the vehicle body direction, the acquired head position of the user, and the sight line direction (Step S2). This is described above with reference to FIG. 6. The retrieval request is not limited to utterance. The arithmetic unit 103 may detect, from the video data taken by the sensor unit 102, that a gesture indicating the retrieval request is made by using part of a body. The head position (positions of the eyes) of the user described above may be replaced with the position of the vehicle 100. That is, the retrieval range R1 may be determined based on the sight line direction of the user and the position of the vehicle 100 at a timing when the user makes the retrieval request on the map. That is, the arithmetic unit 103 identifies the sight line direction of the questioner based on an image of the questioner acquired by the in-vehicle camera at a time point when the first phrase representing that the user has shown an interest in the object outside the vehicle is uttered, or in a predetermined period before the time point. The arithmetic unit 103 determines that the first operation is performed in a case in which the sight line direction is oriented outward from the vehicle 100. The arithmetic unit 103 then identify a view area of the questioner at a first time point as the retrieval range R1 based on the position of the vehicle 100 and the sight line direction of the questioner at the first time point, and the map information.

Next, the arithmetic unit 103 of the vehicle 100 requests 3D map information of the retrieval range R1 from the map information cloud 600a providing map information on the Internet 300 via the communication unit 104 (Step S3). The arithmetic unit 601 of the map information cloud 600a receives this request (Step S4). The arithmetic unit 601 of the map information cloud 600a that has received the request returns the 3D map information including the retrieval range R1 to the vehicle 100 via the communication unit 104 (Step S5).

The arithmetic unit 103 of the vehicle 100 that has acquired the 3D map information of the retrieval range R1 extracts candidate points that are easily visually recognized (or can be visually recognized) by the user in the retrieval range R1 (Step S6). Details thereof are described above with reference to FIG. 6. The arithmetic unit 103 of the vehicle 100 may extract the candidate points (candidate objects) by converting the head position and the sight line direction of the user on the 3D map, and simulating a landscape that can be seen therefrom.

Next, the arithmetic unit 103 of the vehicle 100 extracts candidate points (candidate objects) each having possibility equal to or higher than predetermined possibility as the object of interest of the user from the candidate points (Step S7). That is, the arithmetic unit 103 extracts the candidate objects as one or more object candidates that are estimated to correspond to the object in which the user has shown an interest. This is also described above with reference to FIG. 6. In a case in which a plurality of the candidate points (candidate objects) are left, the arithmetic unit 103 of the vehicle 100 causes the user to select, and displays information about a specified point (object) (Step S8) as illustrated in FIG. 9. For example, in a case in which there are a plurality of the object candidates, the arithmetic unit 103 identifies, as a first virtual object, one virtual object selected by an input performed by the questioner from one or more virtual objects corresponding to the respective object candidates. The arithmetic unit 103 then displays information of the identified point (object).

Additionally, the arithmetic unit 103 of the vehicle 100 displays options (buttons) such as "set this point (object) as destination (via-point)" and "register this point (object)" in addition to information display of the point (object) identified herein, and determines which one of them is selected by the user (Step S9). In a case in which the user does not select the options, the arithmetic unit 103 ends the processing. Accordingly, processing on the PDS side ends without being generated.

On the other hand, in a case in which the user shows a reaction of showing an interest such that the user sets the point (object) as a destination or registers the point (object) as a favorite, a predetermined time or more has elapsed after the sight line is detected by the sensor unit 102 such as a camera of the vehicle 100, the user has been reading detail information for a predetermined time or more, and the like, the process proceeds to Yes, and the arithmetic unit 103 of the vehicle 100 requests registration of the interest information of the user to the PDS via the communication unit 104 (Step S10). After receiving the request, the arithmetic unit 202 of the PDS records it in the memory 206 as the interest information of the user (Step S11). The interest information includes a user ID, date and time information, place information, information of a point or an object as the object of interest. Details of the interest information will be described later.

The arithmetic unit 202 of the PDS that has accumulated a new piece of the interest information of the user notifies the vehicle 100 of an incentive for registration thereof (for example, an electronically represented token) via the communication unit 203 (Step S12). The arithmetic unit 103 of the vehicle 100 that has received the incentive notifies the user of content of the received incentive for registration using the information input/output unit 106 (Step S13). Thereafter, the entire processing ends.

In this way, curiosity or an interest in a point (object) around the vehicle 100 shown by the user can be easily retrieved, and in a case in which the user shows a reaction from which a high degree of interest in the point (object) is detected, it is accumulated in the PDS as the interest information. Due to this, the user or the vehicle 100 can obtain the incentive. The interest information of the user accumulated as described above can create a new added value by giving use permission to a third-party service provider. Details thereof will be described later.

FIG. 11 is a data structure diagram illustrating an example of the interest information of the user. This illustrates content of the interest information transmitted from the vehicle 100 to the PDS. As illustrated in the drawing, in the interest information, a date and time when the user shows the interest (or a date and time of transmission from the vehicle 100 to the PDS) is written first. In this example, the date and time is represented in ISO8601 format, that is, 9:38:11 on Mar. 23, 2022 as Japan Standard Time. Next, the user ID is written. This user ID is identification information for identifying the user who shows the interest information. Additionally, as a passenger ID, written is identification information for identifying the passenger P riding on the vehicle 100 together with the user at the time when the user shows the interest information. For example, 12008 indicates the passenger P who has been personally identified in the vehicle 100, and 99999 indicates the passenger P who could not be personally identified in the vehicle 100.

A vehicle ID is identification information for identifying the vehicle 100 (vehicle identification number). The interest information is information for identifying an object of interest of the user. In this example, a field is food and drink as an interest category, a type of food is ramen as a subcategory, ∘∘ noodle as a store name is written as an object of interest in which the user shows an interest, latitude and longitude information is written in ISO6709 format as a place of the object of interest, and a degree of interest is written as 7 as a degree of interest of the user. The degree of interest is a degree of interest that is represented by a plurality of stages from 0 (low) to 9 (high), and is evaluated by detecting a reaction of the user, a reaction such that how long the user has examined related information, or a reaction of registering the object as a destination or registering the object as a favorite point. The degree of interest 7 may be a degree of interest that is given when the user registers a place of the object of interest as a point, for example.

By recording the passenger ID in the interest information managed by the PDS, it is possible to set a condition for the passenger P at the time of using the interest information. For example, at the time of using the interest information belonging to a certain category (or subcategory), it may be checked whether there is only the passenger P (of the passenger ID that is personally identified) recorded in the interest information of this category (or subcategory thereof) one or more times, and the interest information may be permitted to be used if there is only that person, and the interest information may be prohibited to be used if there is another person. If the passenger ID indicates a company to which an individual belongs, it is possible to prevent the interest information about a category/subcategory related to business registered as the interest information in the past from being provided in a vehicle in which a person belonging to another company is riding together. On the contrary, in a case in which only people belonging to the same company are riding together, presentation of the interest information about a category/subcategory related to the business can be automatically turned ON.

FIG. 12 is a data structure diagram illustrating an example of the interest category of the user. In this example, listed are interest categories that are collected and accumulated for the user whose user ID is 10001 (the user who has asked the question described above, and registered ∘∘ noodle as a point). As illustrated in the drawing, for this user, degrees of interest are registered to be 8 for a food and drink category, 7 for a history category, and 4 for a scenic spot category. The degree of interest is a numerical value indicating an interest of the user in a plurality of stages as described above, and is calculated based on the interest information that has been accumulated.

In this example, it can be found that the user has a relatively high interest in the food and drink category and the history category. Thus, it can be found that an interest of the user may be attracted when information belonging to the food and drink category is presented to the user, and a new behavior may be caused.

Herein, the degrees of interest for the interest categories are listed, but the present disclosure is not limited thereto. The degrees of interest of a specific user may be written at a more abstract level or a more detailed level.

Figure 13:
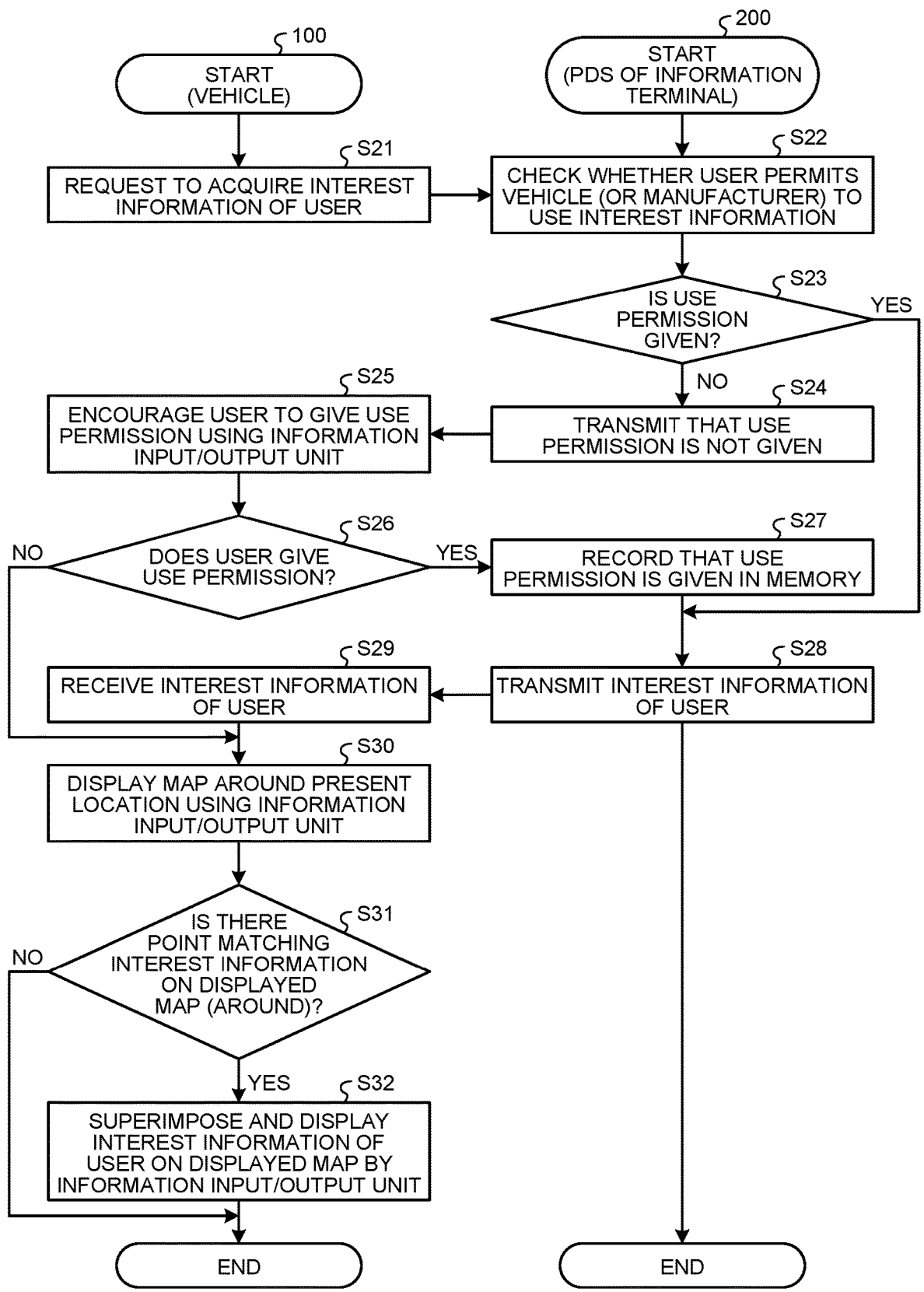
FIG. 13 is a flowchart illustrating an example of displaying a map on which the interest information is superimposed.

FIG. 13 is a flowchart illustrating an example of displaying a map on which the interest information is superimposed. Herein, the following describes an example of additionally displaying a point (object) in which the user may show an interest on the map of the navigation screen 122 by acquiring the interest information from the PDS of the user riding on the vehicle by the vehicle 100. The PDS may be a PDS of the personal information management cloud 400 instead of the information terminal 200.

First, the arithmetic unit 103 of the vehicle 100 requests the interest information of the user from the PDS by designating the user ID and the vehicle ID (or a manufacturer ID, or an app ID for identifying an app) (Step S21). After receiving the request via the communication unit 203, the arithmetic unit 202 of the PDS checks whether the user of this user ID gives use permission for the interest information to the vehicle 100 of the vehicle ID (or a manufacturer of the manufacturer ID, or an onboard device app of the app ID) by verifying a database recorded in the memory 206 (Step S22). If it is determined that use permission is given thereto (Step S23), the process proceeds to Yes, and the PDS transmits the interest information of the user (for example, the interest information in FIG. 11, or interest category information in FIG. 12) to the vehicle 100 via the communication unit 203 (Step S28). On the other hand, if it is determined that use permission is not given thereto (Step S23), the process proceeds to No, and the PDS transmits that use permission is not given thereto to the vehicle 100 via the communication unit 203 (Step S24). In the above description, the PDS is assumed to be provided in the information terminal 200, but in a case in which the PDS is provided in the personal information management cloud 400, the arithmetic unit, the communication unit, and the memory of the PDS are the arithmetic unit 401, the communication unit 402, and the memory 403, respectively. The same applies to the following description.

After receiving this, the vehicle 100 displays a message for encouraging the user to give use permission thereto by using the information input/output unit 106 (Step S25). If the user gives use permission thereto (Step S26), the process proceeds to Yes, and the arithmetic unit 103 of the vehicle 100 notifies the PDS of it via the communication unit 104. The arithmetic unit 202 of the PDS records and manages that the user has given use permission for the interest information of the user to the vehicle ID (or the manufacturer ID or the app ID) by updating the database recorded in the memory 206 (Step S27). Assuming that use permission is given thereto, the PDS transmits the interest information of the user to the vehicle 100 via the communication unit 203 (Step S28). The arithmetic unit 103 of the vehicle 100 receives the interest information of the user via the communication unit 104 (Step S29). On the other hand, if the user does not give use permission thereto (Step S26), the process proceeds to No, and the arithmetic unit 103 of the vehicle 100 continues the processing without using the interest information of the user or assuming that no information is registered.

The arithmetic unit 103 of the vehicle 100 displays a map around a present location by using the information input/output unit 106 (Step S30). The arithmetic unit 103 of the vehicle 100 then checks whether there is a point that matches (or that is determined to have high relevance with) the interest information of the user on (or around) the displayed map (Step S31). If such a point is present (Step S31), the process proceeds to Yes, and the arithmetic unit 103 of the vehicle 100 superimposes and displays additional information matching the interest information of the user on the map displayed by the information input/output unit 106 (Step S32). The processing is then ended. On the other hand, if such a point is not present (Step S31), the process proceeds to No, and the arithmetic unit 103 of the vehicle 100 ends the processing.

In this way, when the vehicle 100 acquires the interest information of the user from the PDS, some additional information can be displayed on the map corresponding to the point (object) in which the user may show an interest. Due to this, such an information presentation system constituted of the vehicle 100 and the PDS can create an opportunity for the user to find a point (object) matching an interest and curiosity of himself/herself not only from a landscape through a vehicle window but also from the navigation screen 122 and the like.

In the example described above, it can be considered that the user who has registered the ramen store named "∘∘ noodle" as a point has a high degree of interest in ramen. Thus, information about a ramen store may be displayed on the navigation screen 122 of such a user.

Figure 14:
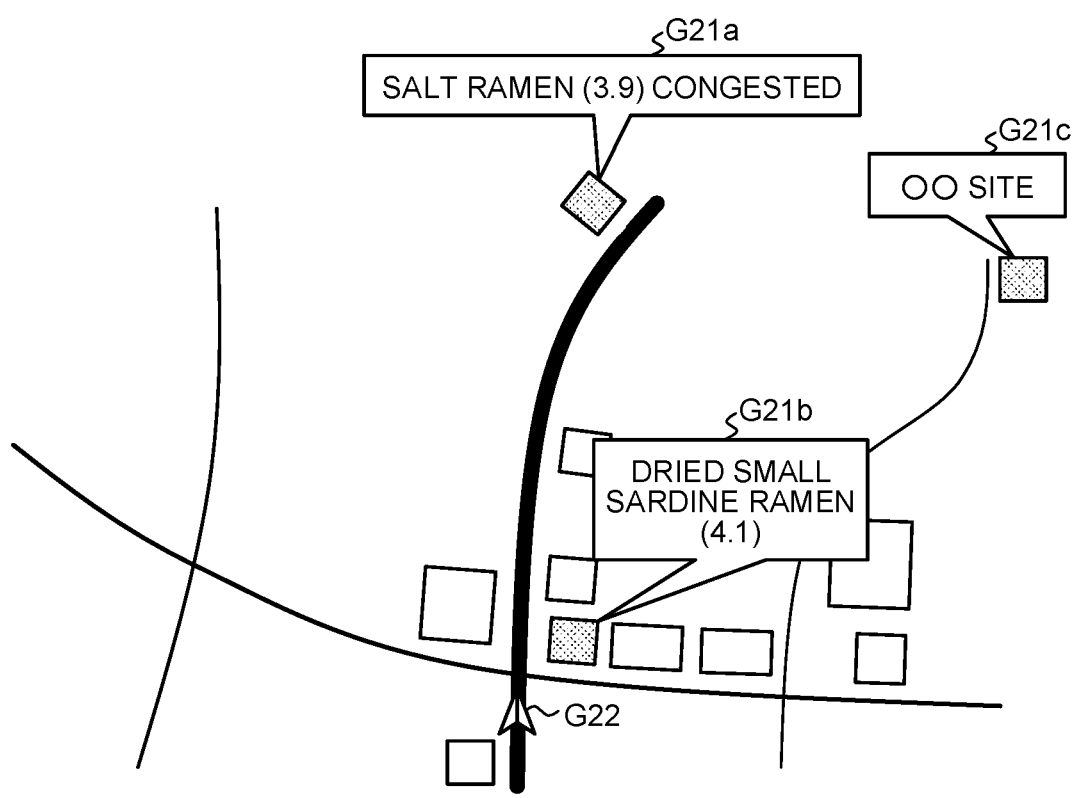
FIG. 14 is a diagram illustrating an example of displaying a map on which the interest information is superimposed.

FIG. 14 is a diagram illustrating an example of displaying a map on which the interest information is superimposed. This drawing is a complement to FIG. 13. After acquiring the interest information of the user from the PDS, in a case in which there is a point or an object having a high correlation equal to or higher than a predetermined value with the interest information of the user, the arithmetic unit 103 of the vehicle 100 automatically superimposes and displays a message image G21 included in the interest information on the map. The arithmetic unit 103 of the vehicle 100 also superimposes and displays, on the map, a vehicle position image G22 indicating the position of the vehicle 100 on the map.

In FIG. 14, an arrow-shaped icon on a lower side indicates the current position and the traveling direction of the vehicle 100. As the navigation screen 122, a route to a destination is indicated by a wide line, and points and objects that have a high correlation with the interest information of the user and are present at a predetermined distance from the route are highlighted or pop-up displayed. Herein, the interest category of the user is food and drink, the subcategory is ramen, and the user is also interested in the history category, so that a message of "dried small sardine ramen (4.1)" is displayed as a message image G21b for a dried small sardine ramen store along the route, and "salt ramen (3.9) congested" is displayed as a message image G21a for a salt ramen store. In the message image G21b for the dried small sardine ramen store, 4.1 indicates a score by word of mouth, or a degree of correlation with the interest information of the user. In the message image G21a for the salt ramen store, 3.9 indicates a score by word of mouth, or a degree of correlation with the interest information of the user, and a word of "congested" indicates that the store is congested. Additionally, a message image G21c for a historical ∘∘ site is displayed at a point slightly deviated from the route. The message image G21c for the ∘∘ site indicates that there is the ∘∘ site.

In this way, by displaying the message image for notifying the user of a point having a high correlation with the interest information of the user on the information input/output unit 106 of the vehicle 100, it is advantageous that the user can easily obtain new discovery and an experience value accompanying real movement.

Figure 15:
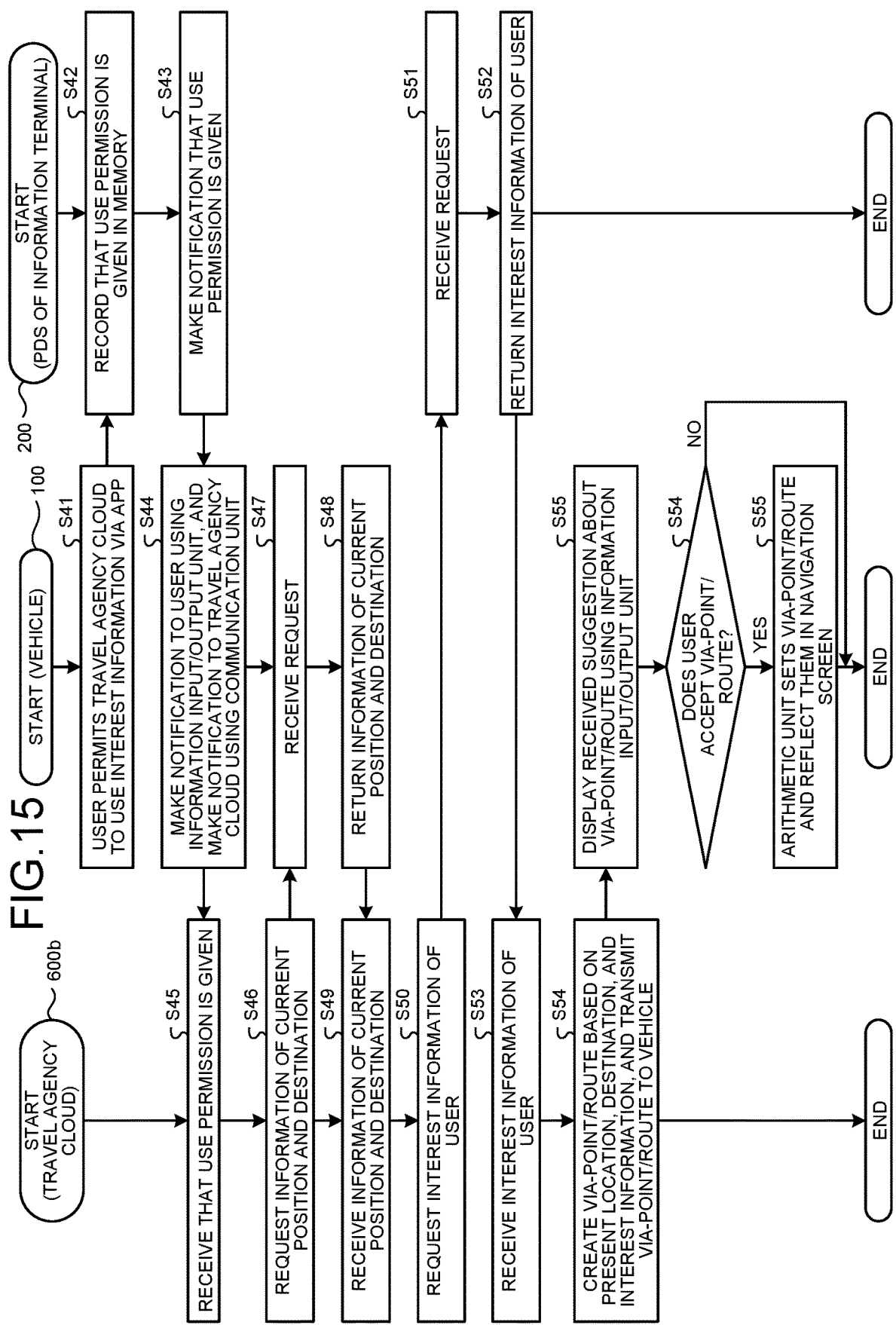
FIG. 15 is a flowchart illustrating an example of displaying a via-point based on the interest information.

FIG. 15 is a flowchart illustrating an example of displaying a via-point based on the interest information. The following describes an example in which a third party (herein, explained as a travel agency by way of example) suggests a route including a new via-point for the user of the vehicle 100 while examining original data, the third party that has acquired a current position from the vehicle 100 (that may be a computer connected to a network used by the user instead of the vehicle, and may be a smartphone or an app operating thereon), and has acquired the interest information from the PDS of the information terminal 200. The travel agency cloud 600b as a cloud of a travel agency is an example of the third party cloud 600. The PDS is assumed to be provided in the information terminal 200 in FIG. 15, but the present disclosure is not limited thereto. The PDS may be provided in the vehicle 100 or the personal information management cloud 400.

First, in this example, the user performs setting for permitting, by the user himself/herself, the travel agency to acquire and use the interest information of the user for creating a route via an app (setting app) installed in the vehicle 100 (Step S41). The arithmetic unit 103 of the vehicle 100 requests the PDS to allow the travel agency cloud 600b to access the interest information of the user via the communication unit 104.

After receiving the request, the arithmetic unit 202 of the PDS records that the user himself/herself permits the travel agency to acquire and use the interest information in the database on the memory 206 (Step S42). The arithmetic unit 202 of the PDS then notifies the vehicle 100 that use permission is given via the communication unit 203 (Step S43). After receiving the notification, the arithmetic unit 103 of the vehicle 100 notifies the user of that effect using the information input/output unit 106, and notifies the travel agency cloud 600b of that effect using the communication unit 104 (Step S44).

The travel agency cloud 600b receives that use permission is given (Step S45). After receiving this, the travel agency cloud 600b requests information of the current position and the destination of the vehicle 100 from the vehicle 100 (Step S46). The arithmetic unit 103 of the vehicle 100 receives this request via the communication unit 104 (Step S47).

After receiving the request via the communication unit 104, the arithmetic unit 103 returns the information of the current position and the destination of the vehicle 100 to the travel agency cloud 600b (Step S48). Here, the notification that the user of the user ID is riding on the vehicle 100 of the vehicle ID and the interest information of the user of the user ID is managed by the PDS is assumed to be made to the travel agency cloud 600b, (the app of) the vehicle 100, and the PDS as needed.

The travel agency cloud 600b receives the information of the current position and the destination of the vehicle 100 via the communication unit 602 (Step S49). After receiving this information via the communication unit 602, the travel agency cloud 600b requests the interest information of the user of the user ID from the PDS (Step S50). The PDS receives the request for the interest information of the user of the user ID via the communication unit 602 (Step S51). The arithmetic unit 202 of the PDS verifies that the travel agency cloud 600b is permitted to use the interest information of the user based on the database, and returns the interest information to the travel agency cloud 600b via the communication unit 602 (Step S52).

The travel agency cloud 600b receives the interest information via the communication unit 602 (Step S53). After receiving the interest information via the communication unit 602, the arithmetic unit 601 of the travel agency cloud 600b creates a via-point in which the user may show curiosity or interest or a new route passing through the via-point based on the current position and the destination of the vehicle 100, and the interest information of the user of the user ID riding on the vehicle, and transmits the via-point or the new route to the vehicle 100 (Step S54). The vehicle 100 receives the via-point or the new route passing through the via-point via the communication unit 104, and the arithmetic unit 103 notifies the user of the via-point or the new route using the information input/output unit 106 (Step S55).

If the user shows a reaction of accepting the via-point or the route passing through the via-point (Step S54), the process proceeds to Yes, the arithmetic unit 103 of the vehicle 100 sets the via-point or the new route passing through the via-point, and an app for depicting the navigation screen 122 displays route information reflecting the via-point using the information input/output unit 106 (Step S55). Thereafter, the processing ends. On the other hand, if the user does not accept the via-point (Step S54), the process proceeds to No, and the arithmetic unit 103 of the vehicle 100 ends the processing without setting the new via-point and without changing the navigation screen 122.

In this way, by accumulating the interest information of the user in the PDS, and causing a third party such as a travel agency to use the accumulated interest information, it is possible to suggest a moving route with which the user can obtain new discovery or awareness while protecting personal information. Previously, the user has made a movement plan by examining a point or an object matching an interest of himself/herself. However, with the information presentation system according to the present disclosure, information can be superimposed on the navigation screen 122 depending on a present location, a destination, and an interest of the user riding on the vehicle, or a new via-point can be recommended. Such an information presentation system can give more discoveries to real movement, is beneficial and stimulative for the user, and gives an opportunity of creating new business to a service provider as a third party. In this example, the user himself/herself permits the third party as the travel agency to use the personal information (interest information) of the user for creating the route, and the third party accesses the information. However, the present disclosure is not limited thereto, and secret calculation may be used. In a case in which secret calculation is used, the personal information is not required to be disclosed to the third party and can be provided while being encrypted, so that it is advantageous that the personal information can be used while being protected more securely.

Figure 16:
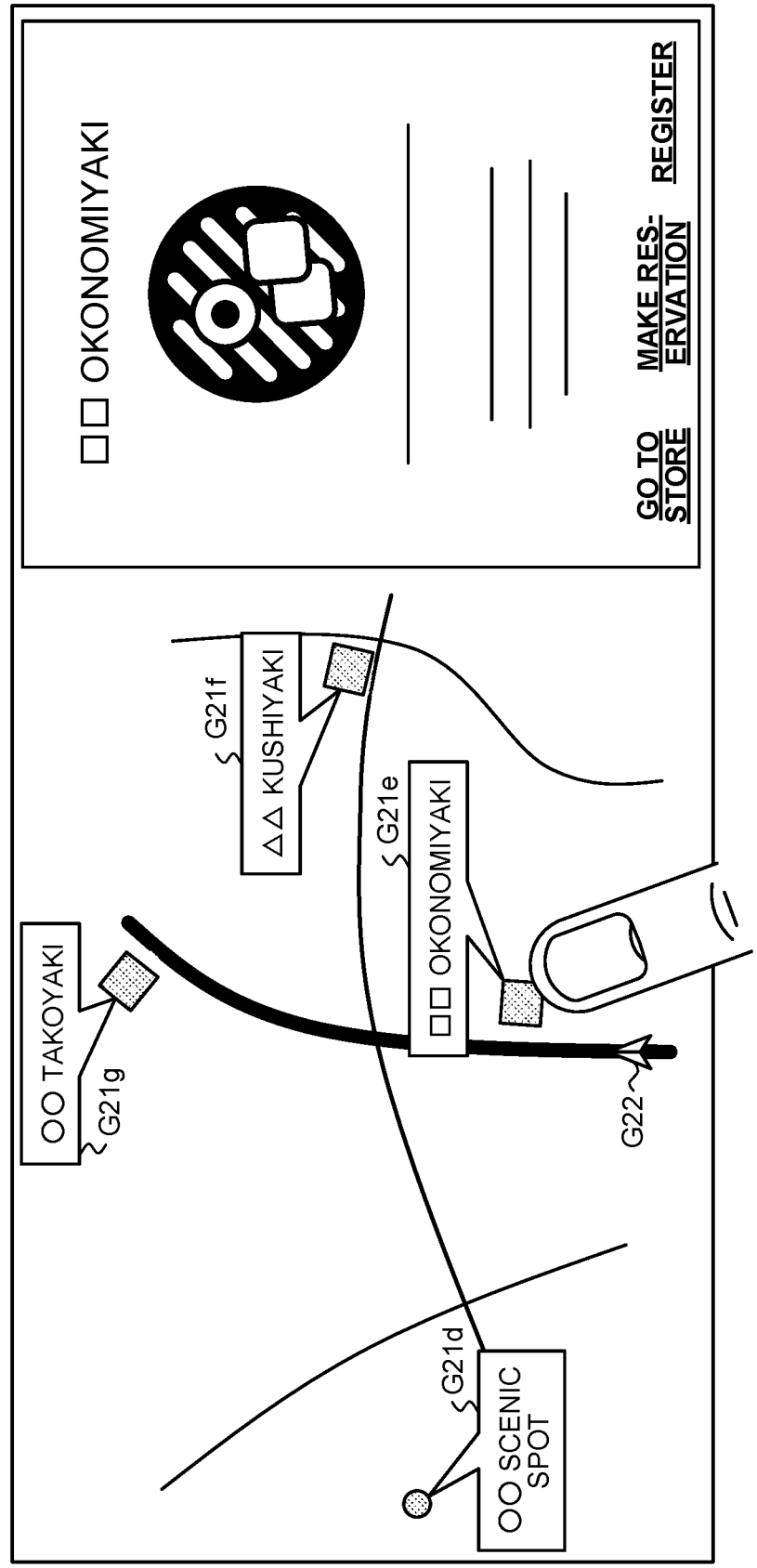
FIG. 16 is a diagram illustrating an example of displaying a map on which the interest information is superimposed.

FIG. 16 is a diagram illustrating an example of displaying a map on which the interest information depicted by the processing in FIG. 15 is superimposed. Herein, exemplified is suggestion about a via-point for a tourist. FIG. 16 illustrates an example of highlighting or pop-up displaying a sightseeing spot or a recommended point in an area on the way in a case in which the vehicle 100 or the user riding on the vehicle 100 is traveling at a place where the user does not usually come, and/or traveling at a place distant from his/her house. The arithmetic unit 103 of the vehicle 100 may also acquire, from the PDS, a visit history of the user moving by the vehicle 100 for areas, stores, routes, and the like in the past, and detect that the user is traveling in an unfamiliar area.

After acquiring the interest category of the user, the travel agency cloud 600b distributes, to the vehicle 100, information of a point matching the interest category/subcategory of the user near the present location of the user on the way to the destination. On the other hand, the arithmetic unit 103 of the vehicle 100 notifies the user of this information by displaying the map via the information input/output unit 106. In a case in which the user seems highly interested in the food and drink category or the scenic spot category based on the acquired interest category information, the travel agency cloud 600b requests the arithmetic unit 103 of the vehicle 100 to highlight a ○○ scenic spot, □□ okonomiyaki, ΔΔ kushiyaki, ○○ takoyaki, and the like around the present location using the information input/output unit 106 of the vehicle 100. This may be requested together with the position information of the point matching the interest category/subcategory and the additional information such as a name of the point, interest category/subcategory information, and information about a degree of congestion at the present time. The arithmetic unit 103 of the vehicle 100 displays a message of "○○ scenic spot" as a message image G21d for ○○ scenic spot, displays a message of " □□ okonomiyaki" as a message image G21e for okonomiyaki, displays a message of "ΔΔ kushiyaki" as a message image G21f for AA kushiyaki, and displays a message of "∘∘ takoyaki" as a message image G21g for 00 takoyaki.

When the user notices the message and selects the store of okonomiyaki by touching it with a finger, for example, information about okonomiyaki is displayed on the information input/output unit 106. This information is displayed on the information input/output unit 106 together with options such as "go to the store" (designate it as a via-point), "make a reservation" (make a reservation to visit the store), and "register" (register this store as the object of interest).

If it is convenient for the user, by touching "go to the store", the store is reflected in a navigation route, and the user can go to okonomiyaki. The user can also find that there are many places having a high correlation with the interest of himself/herself around the present location. Due to this, the user can discover an object of interest that is hardly recognized and tends to be overlooked only by looking out of the vehicle window. Particularly, the user can easily and efficiently find a point that is not recognized and passed by in the middle of movement to a destination during a trip when the point is compared with the interest information of the user and superimposed on the map. Due to this, the user can get new experience accompanying movement. The travel agency cloud 600b may perform processing of charging a target store for an advertisement and publicity fee in exchange for displaying the store to the user, and/or exchange for setting the displayed store as a via-point by the user.

The arithmetic unit 103 can also measure a reaction of the user to the interest information and a degree of interest by a link or a button indicating the options described above, and can additionally accumulate the interest information of the user in the PDS. More specifically, the arithmetic unit 103 estimates a degree of interest of each of the questioner and the passenger P for the object of interest based on the vehicle inside information that is acquired after providing information of the object of interest to the questioner and the passenger P. The arithmetic unit 103 then stores the interest information for identifying the object of interest and the degree of interest of each of the questioner and the passenger P for the object of interest in the memory 108 mounted on the vehicle 100.

First Modification

Figure 17:
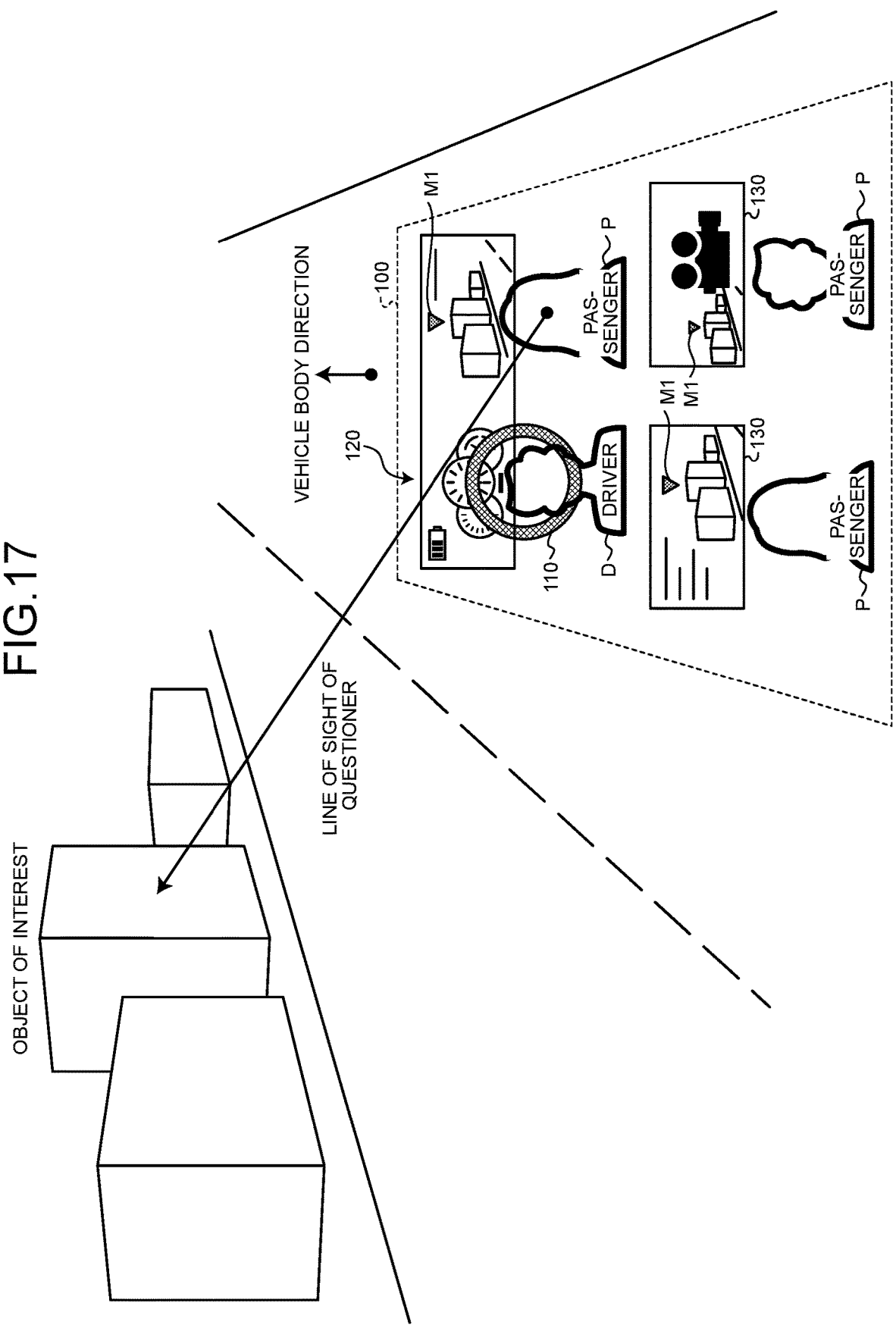
FIG. 17 is a diagram for explaining an example of an information input/output unit provided in a vehicle according to a first modification.

In the above description, the information input/output unit 106 includes the cockpit 120 for front row seats. The information input/output unit 106 may also include a rear row display device 130 for rear row seats. FIG. 17 is a diagram for explaining an example of the information input/output unit 106 provided in the vehicle 100 according to a first modification. In the vehicle 100 illustrated in FIG. 17, the information input/output unit 106 includes the rear row display device 130 for rear row seats. FIG. 17 is a diagram for explaining an example of information display related to the object of interest similarly to FIG. 7 and FIG. 8. FIG. 17 exemplifies a case in which the passenger P seated on the passenger seat on a right side of a front row is the questioner, and is interested in a building in diagonally left front of the traveling direction.

The questioner asks some question such as "What is that building?", the arithmetic unit 103 of the vehicle 100 identifies the object of interest of the questioner using a questioner position at the time when the questioner asks the question. Alternatively, the arithmetic unit 103 of the vehicle 100 identifies the object of interest of the questioner using a vehicle position and a sight line direction of the questioner.

The cockpit 120 displays an image obtained by adding a marker M1 for identifying the object of interest to video of the identified object of interest of the questioner. After identifying the object of interest, the information input/output unit 106 provides the information of the object of interest for explaining the object of interest to the questioner. For example, the cockpit 120 may display information of the object of interest retrieved from the Internet 300. Similarly, the rear row display device 130 displays an image obtained by adding the marker M1 for identifying the object of interest to the video of the identified object of interest of the questioner. Additionally, the rear row display device 130 may display information of the object of interest retrieved from the Internet 300. Specifically, in a case of determining that the first operation is performed, the first operation such as a gesture or utterance indicating that the user shows an interest in an object present around the vehicle 100, the arithmetic unit 103 of the vehicle 100 generates a 3D map image simulating a field of view from a first virtual viewpoint of the questioner at the first time point when the first operation is performed based on the map information, and the position information and the vehicle inside information at the first time point. The arithmetic unit 103 displays the 3D map image on a display of the cockpit 120, the rear row display device 130, and the like. In a case of determining that the first operation is performed, the arithmetic unit 103 displays the 3D map image simulating the field of view of the questioner at the first time point when the first operation is performed on the cockpit 120 or the rear row display device 130 based on the map information, and the position information and the vehicle inside information at the first time point. In the present disclosure, to distinguish between an actual object of interest of the questioner and an object identified as being probably the object of interest of the questioner by the information presentation system in wording, a former object may be referred to as an "object", and a latter object may be referred to as a "first object".

The video of the object of interest displayed on the cockpit 120 and the rear row display device 130 may be video of external appearance of the object of interest viewed from an optional viewpoint outside the vehicle (for example, video of looking down at the object of interest from a diagonally upper side) at the time when the questioner asks the question, or may be video of external appearance generated by simulating scenery in a direction of the object of interest from the questioner position or the vehicle position. In this way, the cockpit 120 and the rear row display device 130 display the video in the sight line direction or the object of interest at which the questioner was looking when the questioner asked the question, highlighted display and the marker M1 for identifying the object of interest, and the information of the object of interest. That is, the cockpit 120 and the rear row display device 130 display the information of the object of interest on the video reproducing a landscape at which the questioner was previously looking. Accordingly, not only the passenger P who has asked the question but also the passenger P who has not asked the question can grasp the object of interest and the information of the object of interest.

The cockpit 120 and the rear row display device 130 display the video of the object of interest or scenery in the sight line direction at the time when the questioner asks the question, but the present disclosure is not limited thereto. The cockpit 120 and the rear row display device 130 may display video at the time when the questioner or the vehicle 100 becomes closest to the object of interest, or may display video of external appearance of the object of interest at the first time point temporally including before and/or after the first time point when the first operation is performed in a format of static image and/or moving image.

As described above with reference to FIG. 6, in a case in which the 3D map information around the vehicle has been acquired, the cockpit 120 and the rear row display device 130 may display video obtained by generating a landscape through the vehicle window in a specific direction viewed from the vehicle 100 at an optional timing by 3D rendering. In a case of generating video from the 3D map information by 3D rendering, the cockpit 120 and the rear row display device 130 can display video of the object of interest with stable quality even in a case in which visibility is poor due to influence of weather and the like, or a case in which a large-size vehicle travels alongside. The 3D map information may be acquired from a computer that manages the 3D map information and provides 3D city model information converted into open data via a network.

In the above description, it is assumed that the cockpit 120 reproduces, from the 3D map information, and displays the scenery seen by the questioner. Alternatively, the cockpit 120 may receive an instruction such as a touch operation from the questioner and change or set a viewpoint position in an optional direction and at an optional distance, or may display video that rotates around the object of interest and continuously displays the object of interest. The information input/output unit 106 receives a change from the first virtual viewpoint to another virtual viewpoint while keeping one or more virtual objects included in the 3D map image, in accordance with an input from the questioner. The questioner can grasp external appearance of the object of interest in more detail by manually changing the viewpoint position, or when the viewpoint position is automatically changed.

In the above description, it is assumed that the cockpit 120 and the rear row display device 130 generate, from the 3D map information, and display the video of external appearance of the object of interest by 3D rendering, but the present disclosure is not limited thereto. The arithmetic unit 103 acquires vehicle outside information indicating a situation around the vehicle 100 from a sensor such as a camera that photographs the vehicle 100. The information input/output unit 106 displays a 3D map image based on the position information and the vehicle inside information, the map information, and the vehicle outside information. For example, the arithmetic unit 103 acquires data from a sensor (a camera and the like oriented outward from the vehicle) provided in the own vehicle or another vehicle, or a sensor provided in a traffic infrastructure such as a road, traffic lights, and a lighting pole. The information input/output unit 106 also generates video of external appearance of the object of interest from the acquired data. The cockpit 120 and the rear row display device 130 may display the generated video of external appearance of the object of interest.

The information input/output unit 106 may present an answer to the question not only in a region for a questioner's seat but also to other seats excluding the driver's seat in the vehicle 100. That is, the information input/output unit 106 may share the information of the object of interest for explaining the object of interest with at least one passenger P other than the questioner in the compartment.

For example, in FIG. 17, the answer to the question is superimposed and displayed as a small image on lower left of the rear row display device 130 for the passenger P on a right side of the rear row who was watching a movie, and the answer to the question is displayed in more detail on the rear row display device 130 for the passenger P on a left side of the rear row that is displaying nothing. The rear row display device 130 for the passenger P on the left side of the rear row displays more detailed information than the answer for the questioner. That is, an information amount of the information of the object of interest for explaining the object of interest in a case in which the questioner is the driver D of the vehicle 100 is smaller than an information amount of the information of the object of interest in a case in which the questioner is not the driver D. The reason why the rear row display device 130 for the passenger P on the left side of the rear row displays more detailed information than the answer for the questioner is that, if detailed information is displayed on the cockpit 120, it may hinder driving of the driver D. Thus, the cockpit 120 displays the answer that has a small information amount and can be checked in a short time in a case in which the driver D driving the vehicle may look at the answer.

Second Modification

Figure 18:
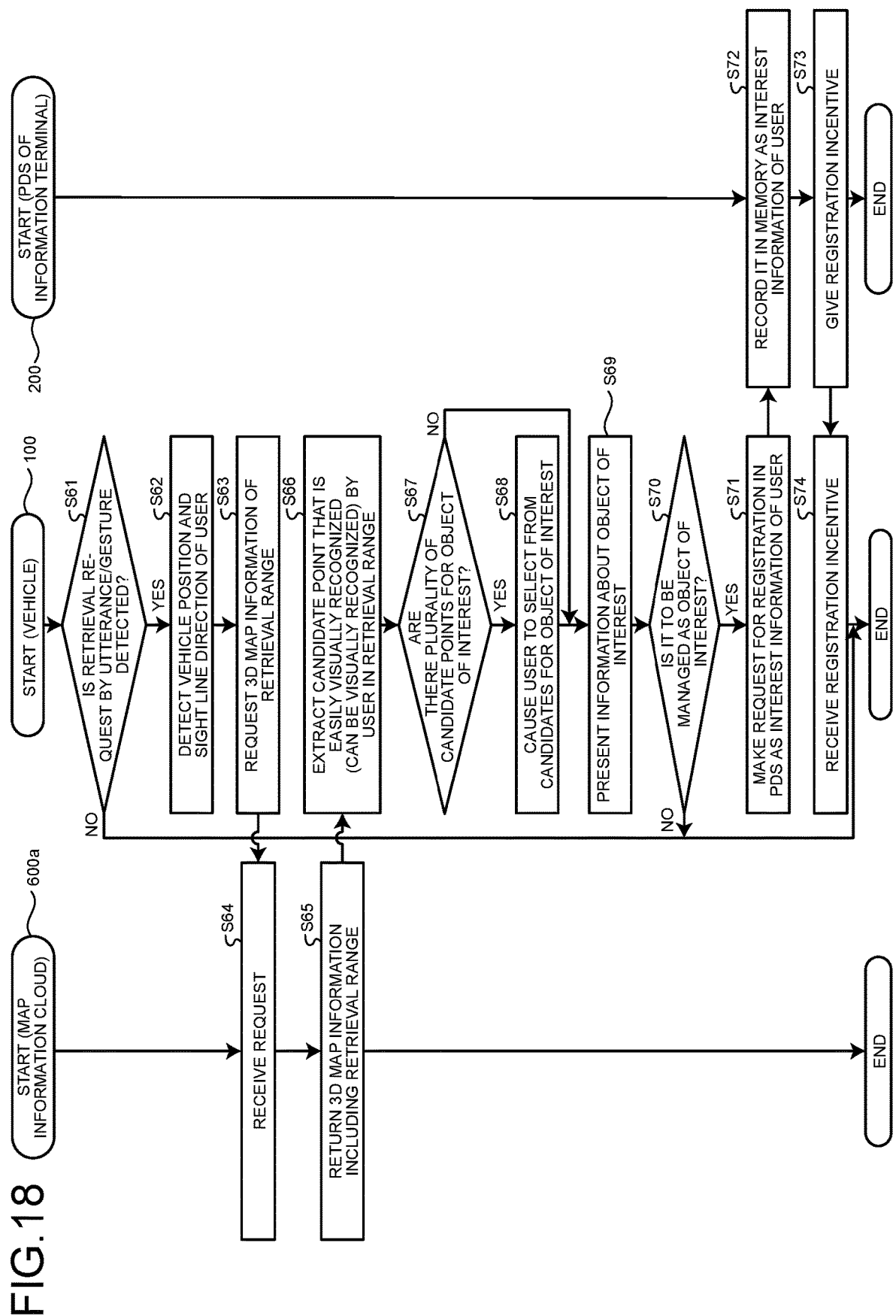
FIG. 18 is a flowchart illustrating an example of information retrieval based on sight line information according to a second modification.

With reference to FIG. 10, described is a procedure of presenting the information about the object of interest in which the passenger P shows an interest. A second modification describes a procedure of presenting the information about the object of interest differently from FIG. 10. FIG. 18 is a flowchart illustrating an example of information retrieval based on the sight line information according to the second modification.

The arithmetic unit 103 of the vehicle 100 detects a retrieval request by detecting utterance of the user from a voice signal collected by the voice microphone 151, or detecting a gesture of the user from video data acquired by the sensor unit 102 (a camera and the like) (Step S61). In a case of detecting utterance or a gesture of the user indicating the retrieval request, the arithmetic unit 103 of the vehicle 100 does not execute retrieval of the interest information, so that the process proceeds to No and the processing is completed. On the other hand, in a case of detecting utterance or a gesture of the user indicating the retrieval request, the arithmetic unit 103 of the vehicle 100 advances the process to Yes, and performs the processing.

To acquire video of the object of interest at which the questioner was looking at or the sight line direction at the time when the user asks the question, or before and after that time, the arithmetic unit 103 of the vehicle 100 detects a timing at which the retrieval request is detected, the vehicle position before and after the retrieval request is made, and the sight line direction of the user (Step S62).

At Step S63 to Step S66, the arithmetic unit 103 of the vehicle 100 and the arithmetic unit 601 of the map information cloud 600a performs the same processing as the processing at Step S3 to Step S6.

The arithmetic unit 103 of the vehicle 100 determines whether a plurality of candidate points for the objects of interest are extracted (Step S67). If a plurality of the candidate points for the object of interest are extracted, the arithmetic unit 103 of the vehicle 100 advances the process to Yes, and causes the user to select any one of the candidate points as illustrated in FIG. 9 (Step S68). If the candidate points are narrowed down to one candidate point, the arithmetic unit 103 of the vehicle 100 advances the process to No, and displays information about the object of interest (Step S69). The information about the object of interest may be information acquired from the map information cloud 600a, may be a name or an address acquired from the map information cloud 600a, or may be information acquired by being retrieved from the Internet 300 based on the external appearance video information.

By detecting utterance of the user or a gesture of the user, the arithmetic unit 103 of the vehicle 100 determines whether to manage the object as the object of interest (Step S70). In a case of managing the object as the object of interest, the arithmetic unit 103 of the vehicle 100 advances the process to Yes, and makes a request for registration in the PDS as the interest information of the user via the communication unit 104 (Step S71). After receiving the request, the arithmetic unit 202 of the PDS records it in the memory 206 as the interest information of the user (Step S72).

The arithmetic unit 202 of the PDS that has accumulated a new piece of the interest information of the user notifies the vehicle 100 of an incentive for registration thereof (for example, an electronically represented token) via the communication unit 203 (Step S73). The arithmetic unit 103 of the vehicle 100 that has received the incentive notifies the user of content of the received incentive for registration using the information input/output unit 106 (Step S74). Thereafter, the entire processing ends.

Third Modification

Figure 19:
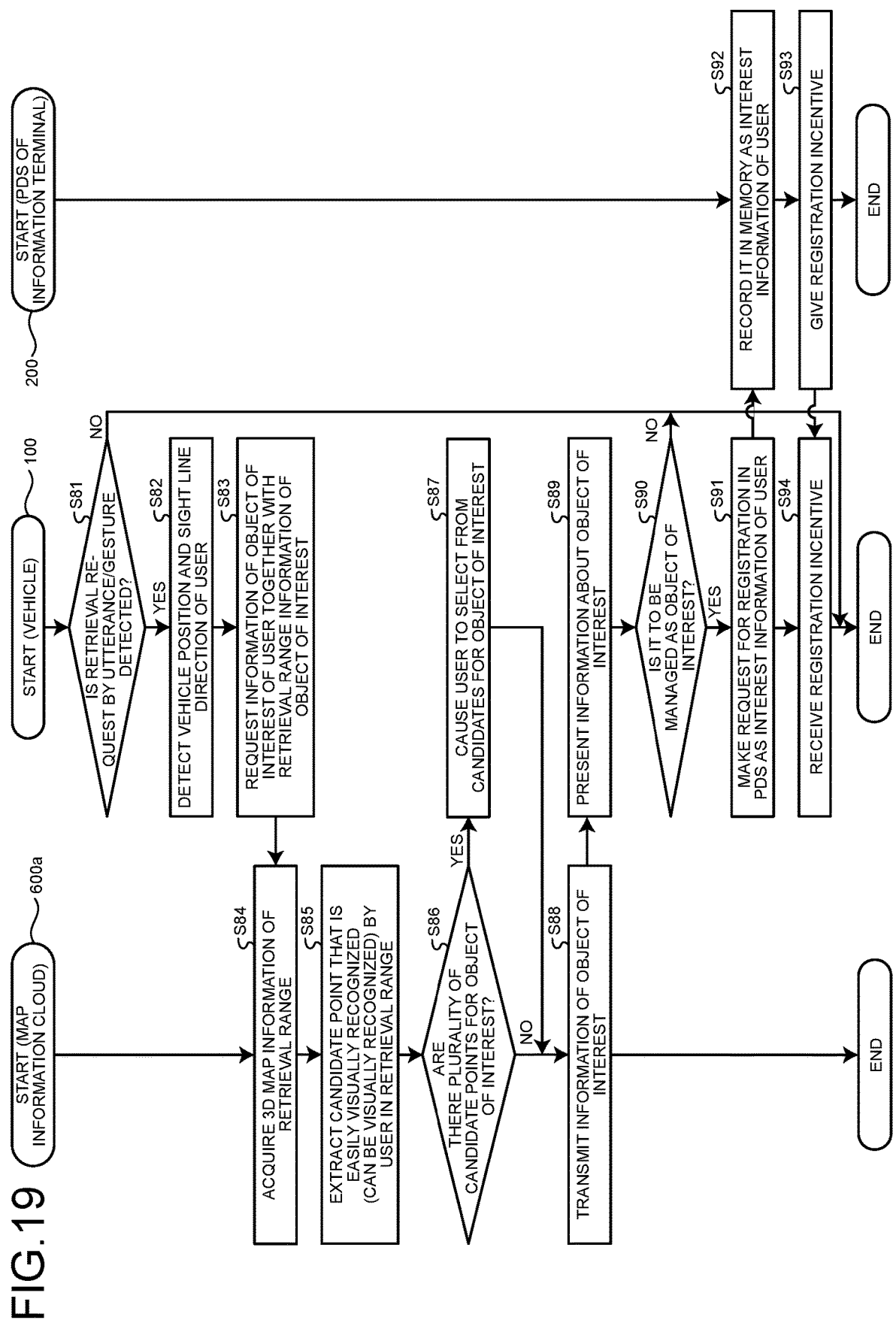
FIG. 19 is a flowchart illustrating an example of information retrieval based on sight line information according to a third modification.
Figure 20:
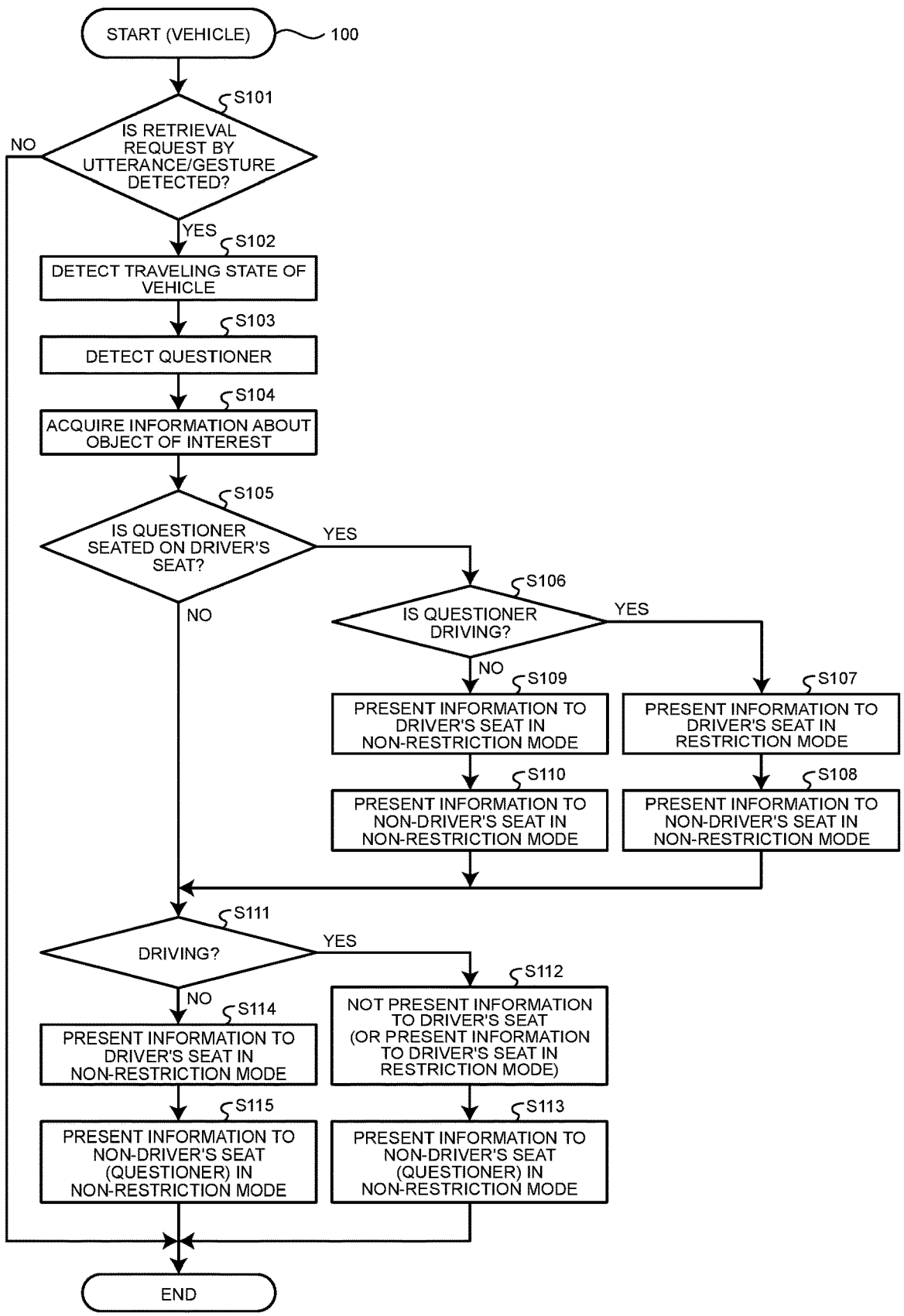
FIG. 20 is a flowchart illustrating an example of information presentation according to a fourth modification.

With reference to FIG. 10, described is a procedure of presenting the information about the object of interest in which the passenger P shows an interest. In a third modification, the map information cloud 600a extracts the object of interest instead of the vehicle 100. The map information cloud 600a is a computer that manages 3D map information. FIG. 19 is a flowchart illustrating an example of information retrieval based on the sight line information according to the third modification.

The arithmetic unit 103 of the vehicle 100 detects a retrieval request by detecting utterance of the user from a voice signal collected by the voice microphone 151, or detecting a gesture of the user from video data acquired by the sensor unit 102 (a camera and the like) (Step S81). In a case of detecting utterance or a gesture of the user indicating the retrieval request, the arithmetic unit 103 of the vehicle 100 does not execute retrieval of the interest information, so that the process proceeds to No and the processing is completed. On the other hand, in a case of detecting utterance or a gesture of the user indicating the retrieval request, the arithmetic unit 103 of the vehicle 100 advances the process to Yes, and performs the processing.

To acquire video of the object of interest at which the questioner was looking at or the sight line direction at the time when the user asks the question, or before and after that time, the arithmetic unit 103 of the vehicle 100 detects a timing at which the retrieval request is detected, the vehicle position before and after the retrieval request is made, and the sight line direction of the user (Step S82).

The arithmetic unit 103 of the vehicle 100 requests information of the object of interest of the user together with retrieval range information indicating the retrieval range R1 from the map information cloud 600a (Step S83).

In a case of receiving the request from the arithmetic unit 103 of the vehicle 100, the arithmetic unit 601 of the map information cloud 600a acquires 3D map information including the retrieval range R1 (Step S84). The arithmetic unit 601 of the map information cloud 600a extracts the candidate point (candidate object) that is easily visually recognized (or can be visually recognized) by the user in the retrieval range R1 (Step S85).

The arithmetic unit 601 of the map information cloud 600a determines whether a plurality of the candidate points for the object of interest are extracted (Step S86). If a plurality of the candidate points for the object of interest are extracted, the arithmetic unit 103 of the vehicle 100 advances the process to Yes, and causes the user to select any one of the candidate points (Step S87). If there is one candidate point for the object of interest, the arithmetic unit 601 of the map information cloud 600a advances the process to No, and transmits information about the object of interest to the vehicle 100 (Step S88).

The arithmetic unit 103 of the vehicle 100 displays the information about the object of interest received from the map information cloud 600a (Step S89).

By detecting utterance of the user or a gesture of the user, the arithmetic unit 103 of the vehicle 100 determines whether to manage the object as the object of interest (Step S90). In a case of managing the object as the object of interest, the arithmetic unit 103 of the vehicle 100 advances the process to Yes, and makes a request for registration in the PDS as the interest information of the user via the communication unit 104 (Step S91). After receiving the request, the arithmetic unit 202 of the PDS records it in the memory 206 as the interest information of the user (Step S92).

The arithmetic unit 202 of the PDS that has accumulated a new piece of the interest information of the user notifies the vehicle 100 of an incentive for registration thereof (for example, an electronically represented token) via the communication unit 203 (Step S93). The arithmetic unit 103 of the vehicle 100 that has received the incentive notifies the user of content of the received incentive for registration using the information input/output unit 106 (Step S94). Thereafter, the entire processing ends.

Fourth Modification

In the above embodiment, described is a case in which the questioner is the passenger P sitting on the passenger seat. The fourth modification describes a case in which the questioner is the driver D sitting on the driver's seat. That is, the fourth modification describes a case of changing a method of presenting the information about the object of interest depending on the questioner.

The arithmetic unit 103 of the vehicle 100 detects a retrieval request from utterance collected by the voice microphone 151 and/or a gesture acquired by the sensor unit 102 (camera and the like) (Step S101). In a case of not detecting the retrieval request, the arithmetic unit 103 of the vehicle 100 advances the process to No, and ends the processing.

On the other hand, if the retrieval request is detected, the process proceeds to Yes, and the arithmetic unit 103 of the vehicle 100 detects a traveling state of the vehicle 100 based on a current traveling speed detected by the sensor unit 102 provided in the vehicle 100, a level of automatic driving that is currently applied, an operation state of the movable unit 105, and the like (Step S102). In other words, the arithmetic unit 103 acquires traveling information indicating the traveling state of the vehicle 100 from the sensor unit 102.

The arithmetic unit 103 of the vehicle 100 detects, from the data acquired by the sensor unit 102, a position at which the questioner who has made the retrieval request is seated (Step S103).

The arithmetic unit 103 of the vehicle 100 acquires, from the map information cloud 600a and/or another computer, the information about the object of interest as the answer to the retrieval request from the questioner (Step S104). For example, the arithmetic unit 103 of the vehicle 100 may acquire the information using any of methods illustrated in FIG. 10, FIG. 18, and FIG. 19, or using another method.

In succeeding processing, the arithmetic unit 103 of the vehicle 100 controls the method of presenting the information about the object of interest depending on whether the questioner is seated on the driver's seat and whether the questioner is driving. In this way, by changing the method of presenting the information in a case in which the driver D is driving, the arithmetic unit 103 of the vehicle 100 can cause the driver D to concentrate on driving.

The arithmetic unit 103 of the vehicle 100 determines whether the questioner is seated on the driver's seat based on the position at which the questioner is seated, detected at Step S103 (Step S105). That is, the arithmetic unit 103 determines whether the questioner is the driver D.

If the questioner is seated on the driver's seat, the process proceeds to Yes, and the arithmetic unit 103 of the vehicle 100 determines whether the questioner is currently driving based on the traveling information indicating the traveling state of the vehicle 100 acquired at Step S102 (Step S106). The traveling information may also include level information indicating a level of automatic driving executed by the vehicle 100. As a level value of the level of automatic driving increases, the number of driving operations is reduced. A level 0 of automatic driving is manual driving. Based on the traveling information and the vehicle inside information, the arithmetic unit 103 determines that the questioner is the driver D in a case in which the questioner is seated on the driver's seat and the level of automatic driving is lower than a predetermined level, and determines that the questioner is an occupant in a case in which the level of automatic driving is higher than the predetermined level. That is, in a case in which the level of automatic driving is high, the arithmetic unit 103 determines that the questioner is not the driver D even if the questioner is seated on the driver's seat.

If the vehicle 100 is in the traveling state, the process proceeds to Yes, and the arithmetic unit 103 of the vehicle 100 makes an answer in a restriction mode in which presentation of the information about the object of interest is restricted (Step S107). That is, the arithmetic unit 103 of the vehicle 100 outputs the information about the object of interest to the driver D who is driving in the restriction mode. Based on the vehicle inside information and the traveling information, in a case in which the first user is the driver D of the vehicle 100 and the vehicle 100 is traveling, the arithmetic unit 103 does not display a 3D map image to the driver D. The arithmetic unit 103 also receives an input by the driver D for specifying the first virtual object from the voice microphone 151 provided in the vehicle 100.

In a case of making an answer in the restriction mode, it is highly convenient with the answer immediately made to the question. However, the information input/output unit 106 presents the answer under one or more constraint conditions not to hinder consideration for safety during driving. For example, in a case of the restriction mode, the information input/output unit 106 presents the information to satisfy the following one or more constraint conditions.

The information input/output unit 106 makes an answer by voice and/or by displaying characters the number of which is smaller as compared with information presentation in a non-restriction mode.

The information input/output unit 106 displays characters in a larger character size as compared with information presentation in the non-restriction mode.

The information input/output unit 106 makes an answer by voice and/or a moving image that is temporally shorter as compared with information presentation in the non-restriction mode.

The information input/output unit 106 makes an answer by still video including characters and/or voice without still video. In other words, the information input/output unit 106 does not perform information presentation represented in a moving image format in which displayed video temporally changes.

The information input/output unit 106 performs information presentation while invalidating or partially restricting a user interface (UI) operation such as zoom, a button, a link, and the like. For example, the information input/output unit 106 receives an operation by voice from the voice microphone 151.

The information input/output unit 106 does not perform information presentation for the driver's seat, and performs information presentation for the passenger P who is not seated on the driver's seat in the restriction mode or the non-restriction mode.

The non-restriction mode is a mode in which presentation of the information about the object of interest is not restricted. For example, the non-restriction mode is applied to a case of presenting the information about the object of interest for the passenger P other than the driver D, or a case of presenting the information about the object of interest for the driver D in a state in which an obligation of considering safe driving is lightened. For example, the non-restriction mode is applied to a case of presenting the information about the object of interest for the driver D who is parking the vehicle, the driver D who is temporarily stopping the vehicle due to a red traffic light and the like, the driver D during automatic driving, or the driver D during driving support at a level equal to or higher than a specific level. For example, the information input/output unit 106 presents the information as follows.

The information input/output unit 106 may make an answer by voice and/or by displaying characters irrespective of a constraint condition for the number of characters imposed in the restriction mode.

The information input/output unit 106 may make an answer by displaying characters in a small character size irrespective of a constraint condition for the character size imposed in the restriction mode.

The information input/output unit 106 may make an answer by a moving image and/or voice irrespective of a temporal constraint condition imposed in the restriction mode.

The information input/output unit 106 makes an answer irrespective of a constraint condition for a moving image imposed in the restriction mode. In other words, the information input/output unit 106 may make an answer in a moving image format in which displayed video temporally changes in addition to voice and/or still video including characters.

The information input/output unit 106 receives an UI operation such as zoom, a button, a link, and the like. Furthermore, the information input/output unit 106 receives an operation by voice from the voice microphone 151.

The information input/output unit 106 performs information presentation for a person who is a non-questioner and a non-driver in the vehicle in the non-restriction mode (Step S108). Based on the vehicle inside information and the traveling information, in a case in which the first user is the passenger P other than the driver D, the information input/output unit 106 displays the 3D map image to the occupant. Based on the vehicle inside information and the traveling information, in a case in which the questioner is the occupant other than the driver D, the information input/output unit 106 receives an input by the occupant from a touch sensor disposed on a display of the cockpit 120 and the like and the voice microphone 151 disposed in the vehicle 100.

While performing information presentation for the questioner (the driver D who is driving) in the restriction mode, the information input/output unit 106 may perform information presentation for a person who is a non-questioner and a non-driver in the vehicle in the non-restriction mode at the same time.

At Step S106, if the questioner is not driving, the information input/output unit 106 advances the process to No. This determination is also made in a case in which the vehicle is driven by a person but is being stopped and the driver D can safely check the information presentation about the object of interest, a case in which automatic driving is performed and the driver D is not actually driving, and the like.

The information input/output unit 106 of the vehicle 100 performs information presentation for the driver's seat in the non-restriction mode (Step S109). The information input/output unit 106 also performs information presentation for a person who is a non-questioner and a non-driver in the vehicle in the non-restriction mode (Step S110). The arithmetic unit 103 receives an input by the driver D for specifying the first virtual object from a touch sensor disposed on a display of the cockpit 120 and the like and the voice microphone 151 disposed in the vehicle 100. While performing information presentation for the questioner (the driver D who is driving) in the non-restriction mode, the information input/output unit 106 may perform information presentation for a person who is a non-questioner and a non-driver in the vehicle in the non-restriction mode at the same time.

If it is determined that the questioner is not seated on the driver's seat at Step S105, the process proceeds to No, and the arithmetic unit 103 of the vehicle 100 determines whether the questioner is driving (Step S111). If the questioner is driving, the process proceeds to Yes, and the information input/output unit 106 does not perform information presentation for the driver's seat (Step S112). Due to this, the information input/output unit 106 prevents the driver D from paying attention to the information about the object of interest. Alternatively, the information input/output unit 106 may perform information presentation for the driver's seat in the restriction mode.

The information input/output unit 106 performs information presentation for a non-driver's seat (a passenger seat or a rear seat) in the non-restriction mode (Step S113). While performing information presentation for the driver's seat in the restriction mode, the information input/output unit 106 may perform information presentation for a person who is a non-questioner and a non-driver in the vehicle in the non-restriction mode at the same time.

If the questioner is not driving at Step S105, the process proceeds to No, and the information input/output unit 106 performs information presentation for the driver's seat (Step S114).

The information input/output unit 106 performs information presentation for a non-driver's seat (a passenger seat or a rear seat) in the non-restriction mode (Step S115). While performing information presentation for the driver's seat in the restriction mode, the information input/output unit 106 may perform information presentation for a person who is a non-questioner and a non-driver in the vehicle in the non-restriction mode at the same time.

Thereafter, the arithmetic unit 103 of the vehicle 100 ends the processing.

In the above description, it is assumed that the information input/output unit 106 performs information presentation for the questioner (the driver D who is driving) in the restriction mode at Step S107, but the present disclosure is not limited thereto. The information input/output unit 106 may present the answer to the driver D as the questioner after waiting until driving is stopped. That is, the information input/output unit 106 may suspend display of the 3D map image for the driver D. In this case, the information input/output unit 106 stands by until driving is stopped at Step S106. That is, the information input/output unit 106 stands by until the vehicle is stopped or automatic driving is performed. The information input/output unit 106 may advance the process to No at Step S106 in a case in which driving is stopped. That is, based on the vehicle inside information and the traveling information, in a case in which the first user is the driver D and the vehicle 100 has stopped, the information input/output unit 106 displays the 3D map image to the driver D. Due to this, the information input/output unit 106 makes an answer to the driver D who is not driving in the non-restriction mode. In this way, the information input/output unit 106 performs information presentation for the driver D after the vehicle is stopped or driving is switched to automatic driving, so that safety can be secured.

In this way, by changing information presentation among the driver D who is driving, the driver D who is not driving, and the passenger P other than the driver D by the information input/output unit 106, it is possible to give pleasure of discovery in movement, and achieve consideration for safety of driving at the same time.

For example, as specific use scenes, conceivable are avoiding performing (suspending) information presentation related to the object of interest for the driver D as long as the driver D is driving as a result of detecting the vehicle state even if the driver D who is driving makes the retrieval request, restricting the driver D not to operate the information input/output unit 106 (a touch panel and the like), performing information presentation related to the object of interest for the driver D after detecting that the vehicle 100 is stopped due to a red traffic light and the like, performing information presentation related to the object of interest for the driver D after detecting that driving is switched to automatic driving, performing information presentation with a small number of characters for the driver D and performing information presentation with a large number of characters for a non-driver, performing information processing using a large character size for the driver D and using a smaller character size for a non-driver, performing information presentation using only the sense of hearing by voice for the driver D and performing information presentation using also the sense of sight by video for a non-driver, and performing information presentation for the passenger P without performing information presentation for the driver D.

Notes

The following techniques are disclosed by the description of the above embodiment.

Note 1. An information presentation method performed by an information presentation system that is mounted on a vehicle and holds map information, the information presentation method comprising:
  acquiring position information indicating a current position of the vehicle from a position sensor mounted on the vehicle;
  acquiring vehicle inside information indicating a situation in a compartment of the vehicle from at least one first sensor mounted on the vehicle;
  acquiring vehicle outside information indicating a situation around the vehicle from at least one second sensor mounted on the vehicle;

determining whether a first operation is performed based on the vehicle inside information, the first operation indicating that a first user in the compartment shows an interest in an object present around the vehicle;

in a case in which it is determined that the first operation is performed, selecting one or more object candidates that are estimated to correspond to the object based on the map information, and the position information, the vehicle outside information, and the vehicle inside information at a first time point when the first operation is performed;

generating a first image including the one or more object candidates in which each of the one or more object candidates is highlighted based on a surrounding image reflecting surroundings of the vehicle included in the vehicle outside information;

displaying the first image on a display mounted on the vehicle; and identifying a first object that is estimated to correspond to the object by the first user from the one or more object candidates included in the first image in accordance with an input by the first user.

Note 2. The information presentation method according to Note 1, further comprising:

acquiring traveling information indicating a traveling state of the vehicle from at least one third sensor mounted on the vehicle;

avoiding displaying the first image to the driver in a case in which the first user is a driver of the vehicle and the vehicle is traveling based on the vehicle inside information and the traveling information;

displaying the first image to the driver in a case in which the first user is the driver and the vehicle is stopped based on the vehicle inside information and the traveling information; and displaying the first image to an occupant in a case in which the first user is the occupant other than the driver based on the vehicle inside information and the traveling information.

Note 3. An information presentation method performed by an information presentation system that is mounted on a vehicle and holds map information, the information presentation method comprising:

acquiring first interest information related to one or more first interest points based on permission of a first user from a computer that manages the one or more first interest points in which the first user showed an interest in the past;

acquiring position information indicating a current position of the vehicle from a position sensor mounted on the vehicle;

generating a first map image in which one or more objects are highlighted, the one or more objects that are positioned around the current position of the vehicle and in which the first user is estimated to show an interest, based on the first interest information, the position information, and the map information; and displaying the first map image on a display mounted on the vehicle.

Note 4. An information presentation method performed by an information presentation system capable of communicating with a first computer via a network, wherein the first computer manages a plurality of user IDs for identifying a plurality of users, a plurality of pieces of interest information indicating one or more points in which respective users have shown an interest, and permission information indicating which company is permitted, by each of the users, to access interest information of himself/herself, the information presentation method comprising:

transmitting, to the first computer via the network, a company ID for identifying a first company, a first user ID for identifying a first user, and first request information for requesting the first company to access first interest information indicating one or more points in which the first user showed an interest in the past;

acquiring the first interest information from the first computer via the network in a case in which the first computer determines that the first user permits the company to access the first interest information based on the company ID, the first user ID, the first request information, and the permission information;

acquiring position information of a current position of the first user from a terminal owned by the first user or a vehicle on which the first user is riding;

generating itinerary information including a plurality of first objects in which the first user is estimated to show an interest and a first route passing through the plurality of first objects based on the position information and the first interest information; and transmitting the itinerary information to the terminal of the first user or the vehicle to cause a display of the terminal or the vehicle to display the itinerary information.

According to the present disclosure, the further improvement can be made.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information presentation method performed by an information presentation system that is mounted on a vehicle and holds map information, the information presentation method comprising:

acquiring position information indicating a current position of the vehicle from a position sensor mounted on the vehicle;

acquiring vehicle inside information indicating a situation in a compartment of the vehicle from at least one first sensor mounted on the vehicle;

determining whether a first operation is performed based on the vehicle inside information, the first operation indicating that a first user in the compartment shows an interest in an object present around the vehicle;

in a case in which it is determined that the first operation is performed, displaying, on a display mounted on the vehicle, a 3D map image simulating a field of view of the first user at a first time point when the first operation is performed based on the position information and the vehicle inside information at the first time point, and the map information; and displaying a first virtual object so as to be discriminable on the display, the first virtual object being estimated to correspond to the object among one or more virtual objects included in the 3D map image.

2. The information presentation method according to claim 1, wherein
the at least one first sensor includes an in-vehicle camera and a microphone,
the information presentation method comprising:
in the determining of the first operation,
   detecting a first phrase uttered by the first user from a voice signal acquired by the microphone;
   in a case in which the first phrase is a specific phrase representing the interest, identifying a sight line direction of the first user based on an image of the first user acquired by the in-vehicle camera at a time point when the first phrase is uttered or a predetermined period before the time point; and
   determining that the first operation is performed in a case in which the sight line direction is oriented outward from the vehicle.

3. The information presentation method according to claim 1, wherein
the at least one first sensor includes an in-vehicle camera,
the information presentation method comprising:
in the displaying of the 3D map image,
   identifying a sight line direction of the first user at the first time point based on an image of the first user acquired by the in-vehicle camera;
   identifying a view area of the first user at the first time point based on the position of the vehicle and the sight line direction of the first user at the first time point, and the map information;
   transmitting information about the view area to an external computer that manages 3D map information;
   receiving the 3D map image that is extracted corresponding to the view area, from the external computer; and
   displaying the 3D map image on the display mounted on the vehicle;
in the identifying of the first virtual object,
   extracting one or more object candidates that are estimated to correspond to the object; and
   in a case in which the one or more object candidates include a plurality of object candidates, identifying, as the first virtual object, one selected by an input from the first user from among one or more virtual objects respectively corresponding to the one or more object candidates.

4. The information presentation method according to claim 1, further comprising highlighting the identified one or more virtual objects on the 3D map image.

5. The information presentation method according to claim 1, wherein
the 3D map image is depicted by simulating the field of view of the first user from a first virtual viewpoint at the first time point,
the information presentation method further comprising receiving a change from the first virtual viewpoint to another virtual viewpoint while keeping the one or more virtual objects included in the 3D map image, in accordance with an input from the first user.

6. The information presentation method according to claim 1, further comprising:
   acquiring traveling information indicating a traveling state of the vehicle from at least one third sensor mounted on the vehicle;
   avoiding displaying the 3D map image to a driver in a case in which the first user is the driver of the vehicle and the vehicle is traveling, based on the vehicle inside information and the traveling information;
   displaying the 3D map image to the driver in a case in which the first user is the driver and the vehicle is stopped, based on the vehicle inside information and the traveling information; and
   displaying the 3D map image to an occupant other than the driver in a case in which the first user is the occupant, based on the vehicle inside information and the traveling information.

7. The information presentation method according to claim 1, further comprising:
   acquiring traveling information indicating a traveling state of the vehicle from at least one third sensor mounted on the vehicle;
   receiving an input by the first user for specifying the first virtual object from a microphone disposed in the vehicle in a case in which the first user is a driver of the vehicle and the vehicle is traveling, based on the vehicle inside information and the traveling information;
   receiving the input by the first user from both a touch sensor disposed on the display and the microphone in a case in which the first user is the driver and the vehicle is stopped, based on the vehicle inside information and the traveling information; and
   receiving the input by the first user from both the touch sensor and the microphone in a case in which the first user is an occupant other than the driver, based on the vehicle inside information and the traveling information.

8. The information presentation method according to claim 7, further comprising acquiring traveling information indicating a traveling state of the vehicle from at least one third sensor mounted on the vehicle, wherein
the traveling information includes level information indicating a level of automatic driving performed by the vehicle,
the information presentation method comprising:
   determining that the first user is the driver in a case in which the first user is seated on a driver's seat and the level is lower than a predetermined level, based on the traveling information and the vehicle inside information;
   determining that the first user is the occupant in a case in which the first user is seated on the driver's seat and the level is higher than the predetermined level based on the traveling state and the vehicle inside information; and
   determining that the first user is the occupant in a case in which the first user is seated on a seat other than the driver's seat, based on the traveling state and the vehicle inside information.

9. The information presentation method according to claim 1, further comprising:
   acquiring traveling information indicating a traveling state of the vehicle from at least one third sensor mounted on the vehicle;
   restricting or suspending display of the 3D map image to the driver in a case in which the first user is a driver of the vehicle and the vehicle is traveling, based on the vehicle inside information and the traveling information; and displaying the 3D map image on the display without restricting or suspending display in a case in which the first user is the driver of the vehicle and the vehicle is not traveling, or in a case in which the first user is not the driver of the vehicle, based on the vehicle inside information and the traveling information.

10. The information presentation method according to claim 1, further comprising presenting first object information to the first user after identifying the first virtual object, wherein the first object information is information for explaining a first object in a real space, the first object corresponding to the first virtual object in the 3D map image.

11. The information presentation method according to claim 10, wherein an information amount of the first object information in a case in which the first user is a driver of the vehicle is smaller than an information amount of the first object information in a case in which the first user is not the driver.

12. The information presentation method according to claim 10, further comprising sharing the first object information with at least one second user other than the first user in the compartment.

13. The information presentation method according to claim 12, further comprising:

estimating a degree of interest in the first object information for each of the first user and the at least one second user based on the vehicle inside information that is acquired after presenting the first object information to the first user and the at least one second user; and storing a first object ID for identifying the first object and the degree of interest in the first object information of each of the first user and the at least one second user, in a storage unit mounted on the vehicle.

14. The information presentation method according to claim 10, further comprising acquiring vehicle outside information indicating a situation around the vehicle from at least one second sensor mounted on the vehicle, wherein the 3D map image is displayed based on the position information, the vehicle inside information, the map information, and the vehicle outside information, and the displaying of the first virtual object includes:

identifying the first object that is estimated to correspond to the object in which the first user has shown an interest, based on the vehicle outside information; and displaying the first virtual object so as to be discriminable on the display, the first virtual object corresponding to the first object.

15. The information presentation method according to claim 1, further comprising acquiring vehicle outside information indicating a situation around the vehicle from at least one second sensor mounted on the vehicle, wherein the 3D map image is displayed based on the position information, the vehicle inside information, the map information, and the vehicle outside information.

16. An information presentation system mounted on a vehicle, the information presentation system comprising:

at least one interface connected to the position sensor and the at least one first sensor;

the display;

a processor; and a memory storing a program for causing the processor to perform the information presentation method according to claim 1.

17. A non-transitory computer-readable medium on which programmed instructions are stored, wherein the programmed instructions, when executed by a computer of the information presentation system, cause the computer to perform the information presentation method according to claim 1.

* * * * *